United States Patent [19]

Fletcher et al.

[11] 4,291,353
[45] Sep. 22, 1981

[54] SYSTEM AND METHOD FOR CLEANING A MAGNETIC HEAD TRANSDUCER

[75] Inventors: Robert L. Fletcher, Richardson; Richard D. VanLandingham, Garland; Sheldon H. Brown, Garland; Alan H. Rittman, Garland, all of Tex.

[73] Assignee: Texas Instruments Incorporated, Dallas, Tex.

[21] Appl. No.: 45,141

[22] Filed: Jun. 4, 1979

[51] Int. Cl.³ .................... G11B 5/41; G11B 23/02
[52] U.S. Cl. .................................. 360/128; 360/99; 360/133; 360/137
[58] Field of Search ................. 360/128, 137, 97–99, 360/86, 135, 133; 15/210 R

[56] References Cited

U.S. PATENT DOCUMENTS

| | | | |
|---|---|---|---|
| 4,065,798 | 12/1977 | Sugisaki et al. | 15/210 R |
| 4,079,427 | 3/1978 | Mann | 360/99 |
| 4,106,067 | 8/1978 | Masuyama et al. | 360/137 |
| 4,180,840 | 12/1979 | Allan | 360/99 |

OTHER PUBLICATIONS

IBM Tech. Disc. Bull., King, Cleaner for The Access Arm and Magnetic Head for Magnetic Disks, vol. 19, No. 3, Aug. 1976, pp. 1037–1038.
IBM Tech. Disc. Bull., G. R. Knutson et al., Abrasive Diskette for Lapping and Cleaning Recording Heads, vol. 20, No. 8, Jan. 1978, pp. 3231–3232.

Primary Examiner—Alfred H. Eddleman
Attorney, Agent, or Firm—Robert D. Marshall, Jr.; Leo N. Heiting; Melvin Sharp

[57] ABSTRACT

A system and method for removing debris and other contaminants from a magnetic head transducer including a head cleaning cartridge containing a flexible sheet of abrasive material for cleaning and polishing the head transducer. The cartridge has a recess in an external surface thereof to distinguish it from a normal recording cartridge. The system includes a sensor member such as a switch for mating with the cartridge recess and indicating that a head cleaning cartridge, rather than a recording cartridge, has been inserted into the system. The system is responsive to a indication from the sensor member that a head cleaning cartridge has been inserted for rotating the abrasive sheet and moving the head transducer back and forth across the abrasive sheet for a predetermined period of time, thereby cleaning and polishing the head transducer.

20 Claims, 39 Drawing Figures

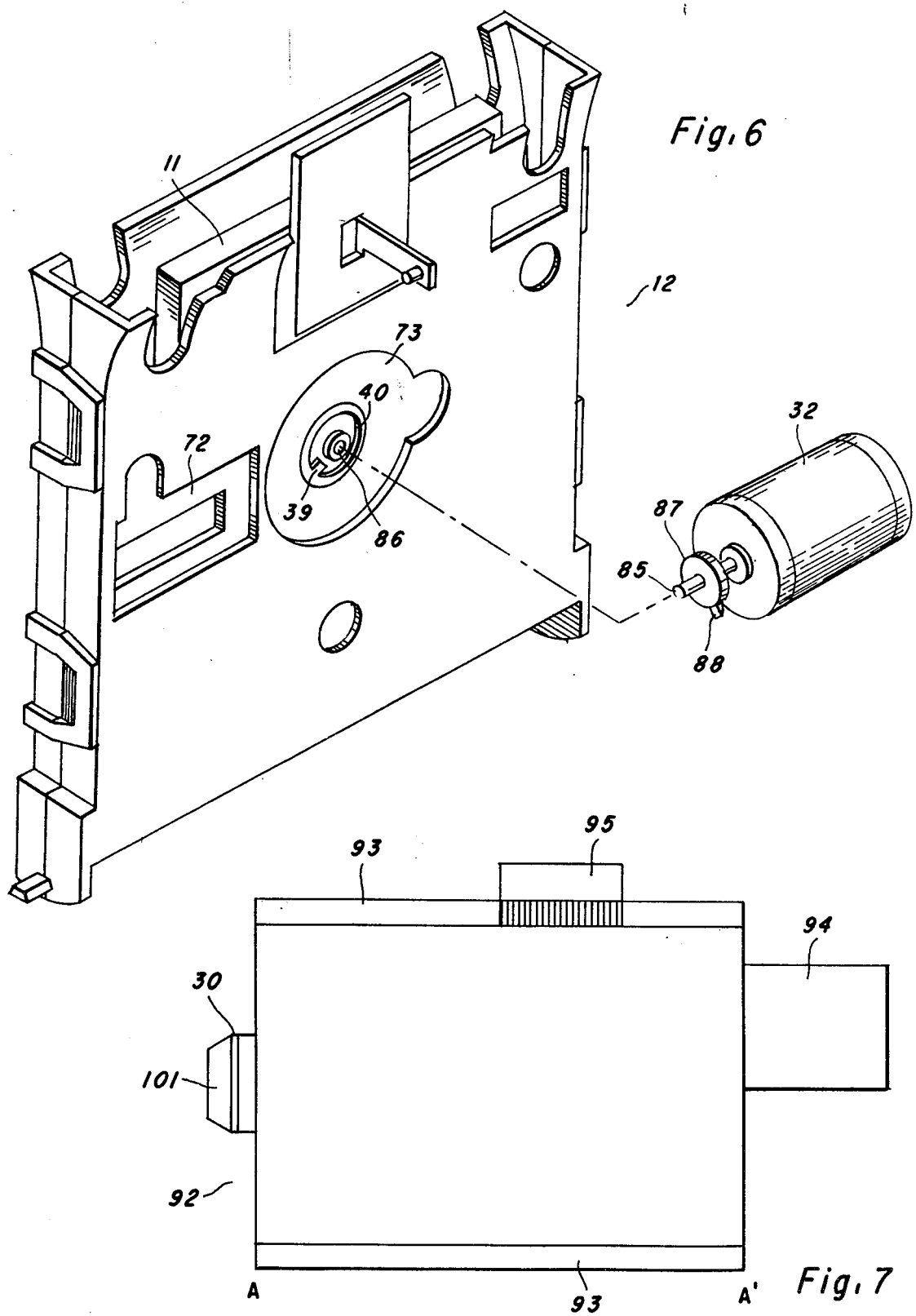

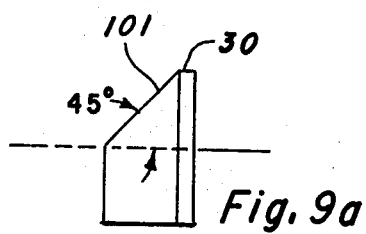
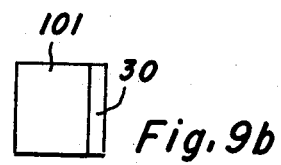
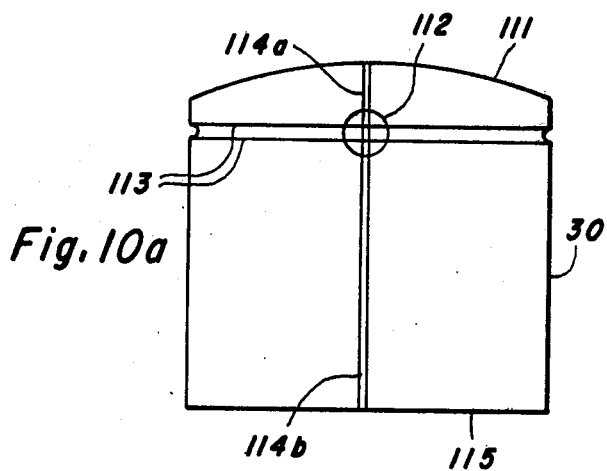
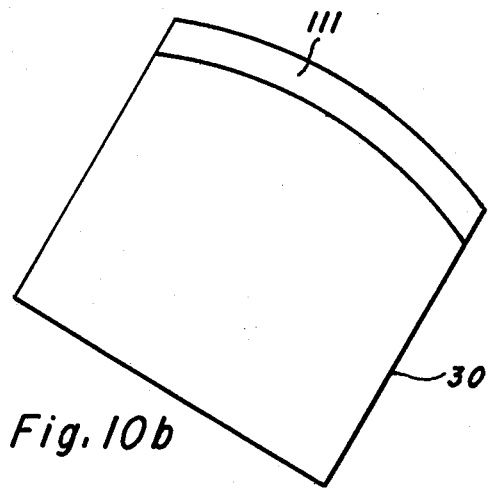
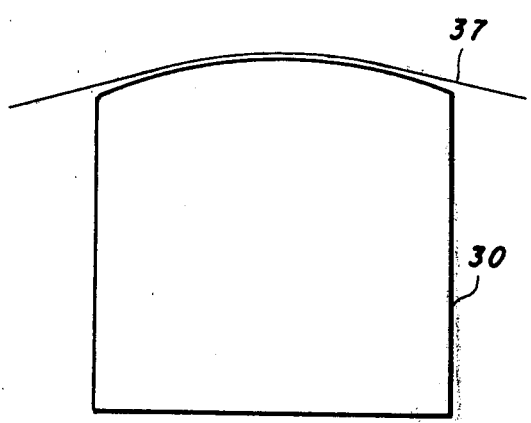
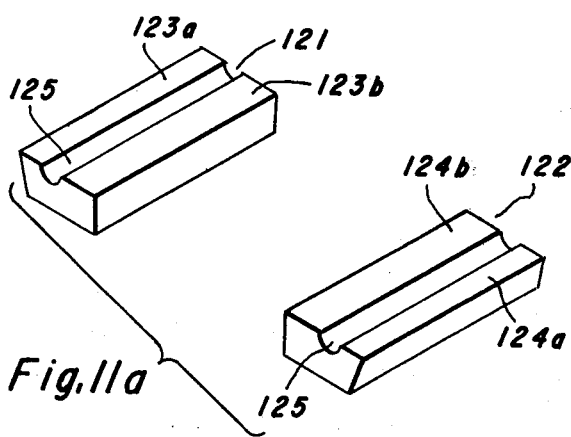
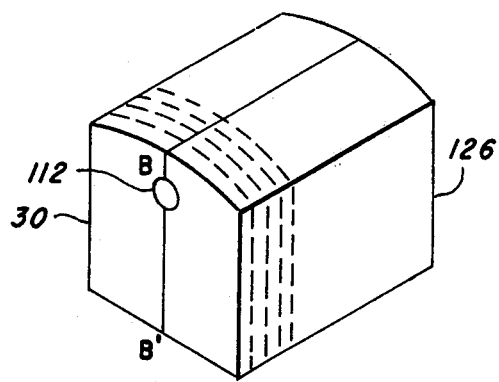

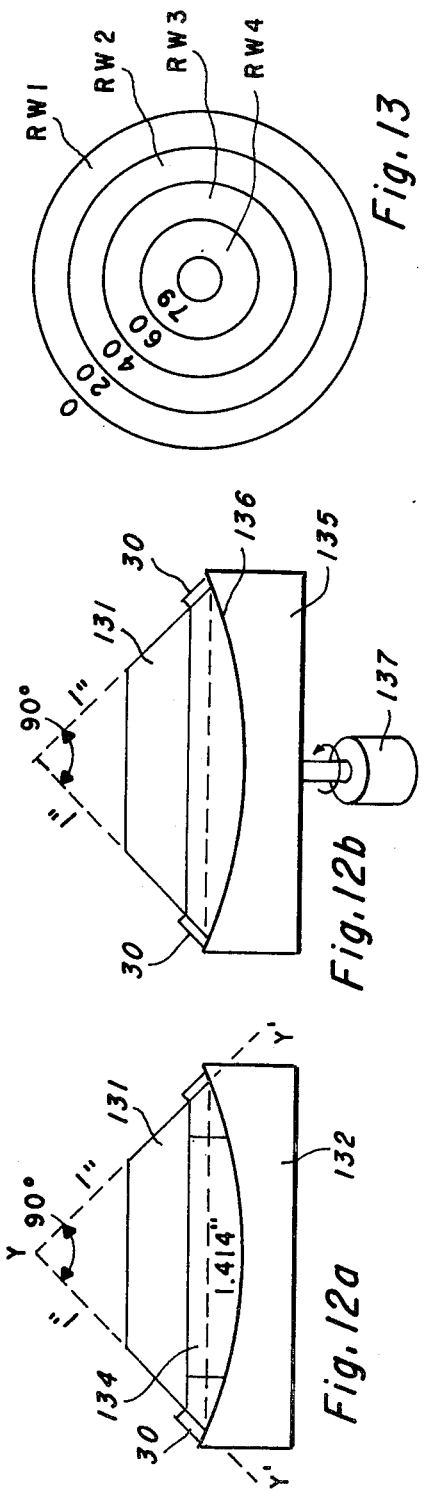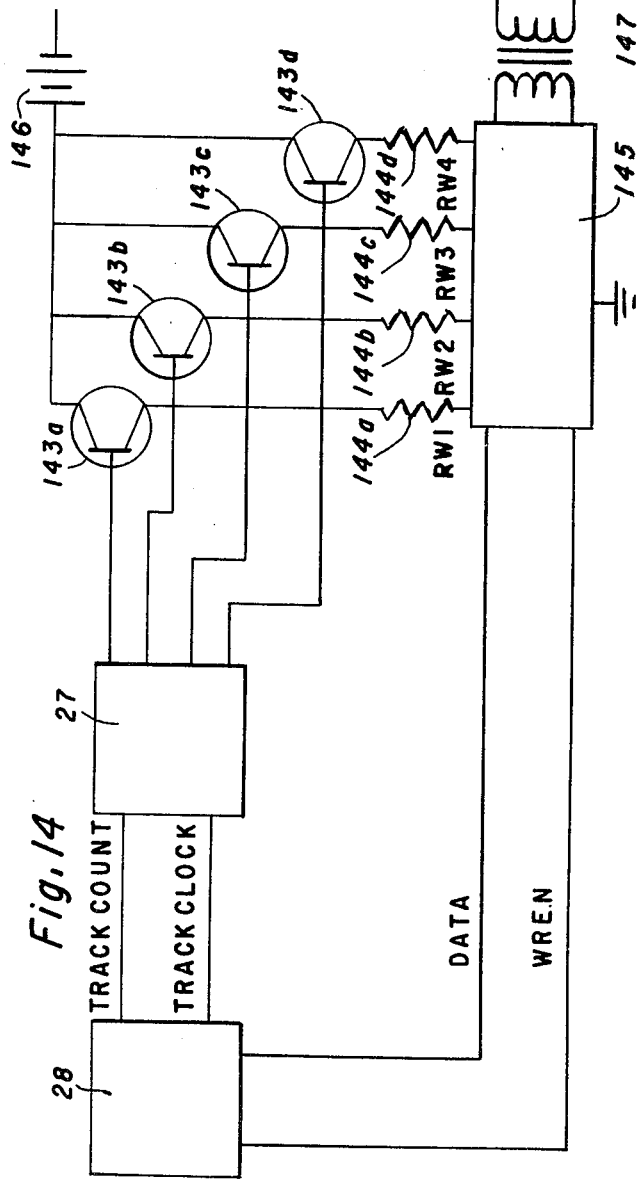

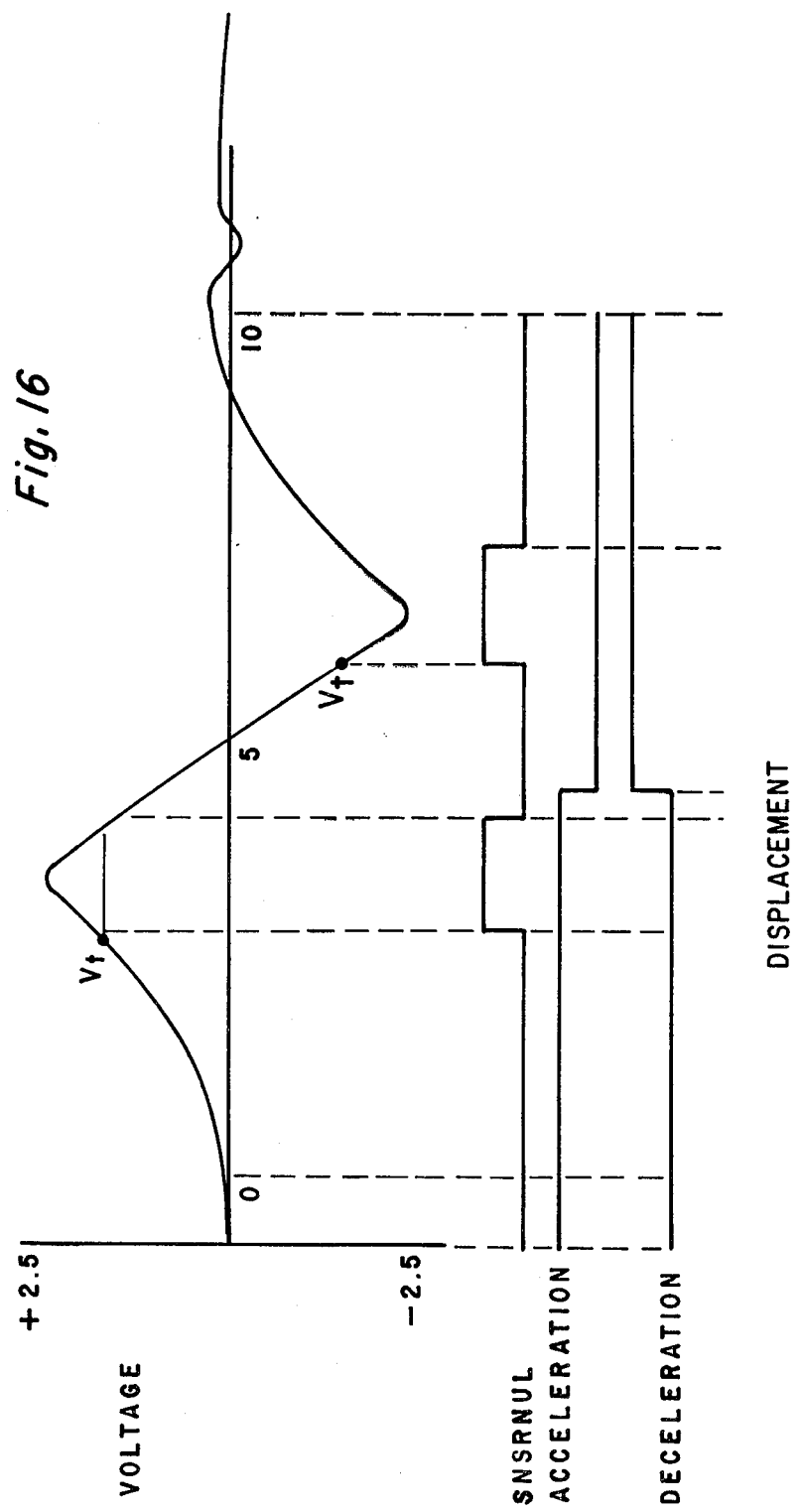

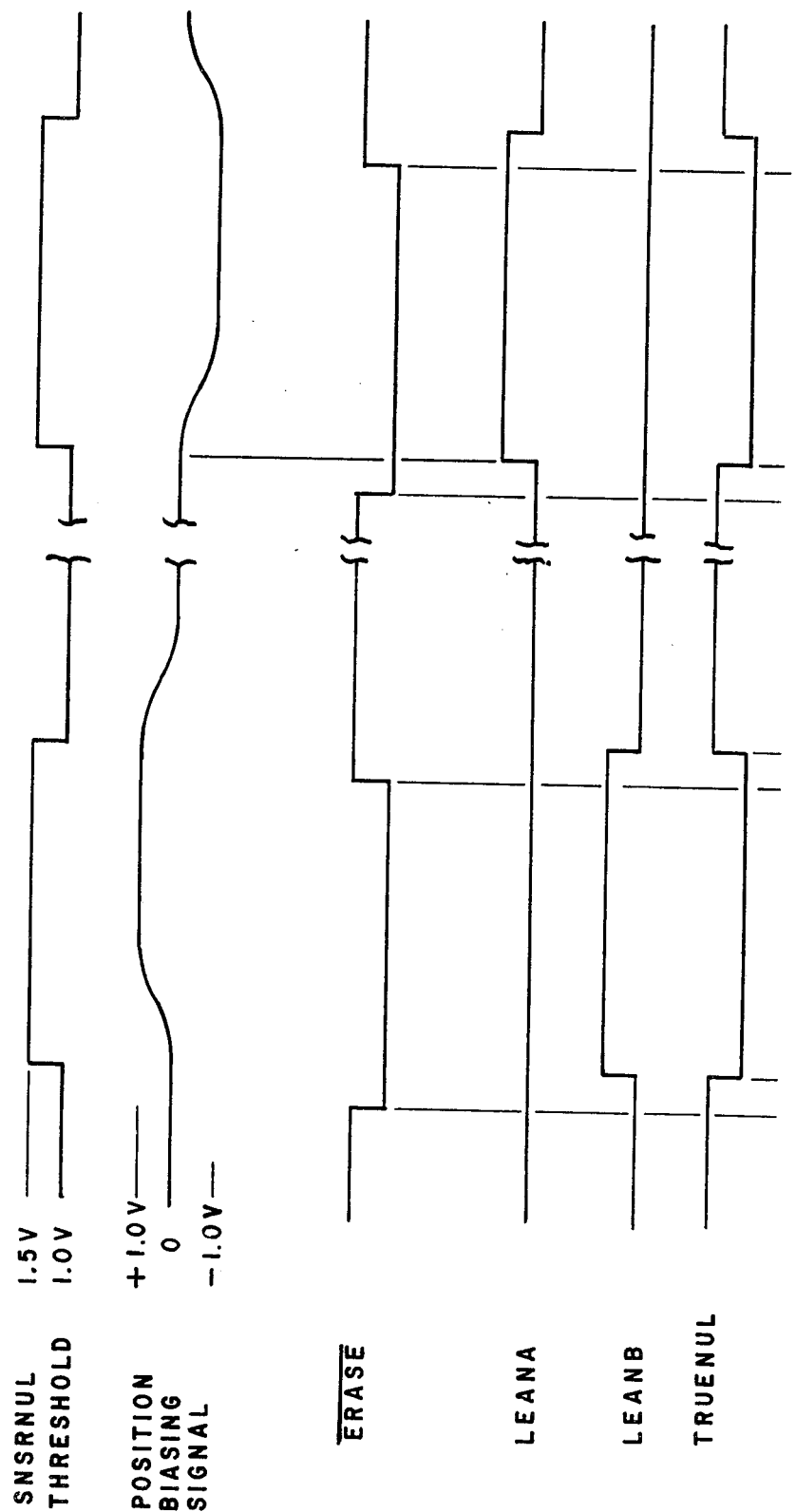

SYSTEM AND METHOD FOR CLEANING A MAGNETIC HEAD TRANSDUCER

BACKGROUND OF THE INVENTION

This invention relates to information storage systems and in particular to information recording or reading systems having means for removing debris from a magnetic head transducer.

In recording or reading information on a moving information storage media, such as a magnetic recording disc, relative motion between a magnetic head transducer used for reading and writing information and the storage media on which information is written on and read from is required. The relative velocity between the head and media interface may be, for example, 550 IPS for video and high density digital applications. To achieve maximum performance, an interface of intimate contact is provided between the head and media surface without destruction or excessive wear of the magnetic flux responsive coating on the surface.

As contact pressure between the head and media is increased to improve performance, both media and head wear are increased. The problem is particularly severe in video applications and compounded with medias utilized for storing single video frames on separate tracks of a magnetic disc wherein one track at a time is continuously in contact with the head to provide a continuous stationary display of a single frame. In only five minutes of playtime revolving at 3,600 RPM, for example, a track on the disc is scraped about 18,000 times by the head; the by-products are so hard and abrasive that the same materials are commonly used as lapping compounds.

To prevent failure caused by contact between the head and disc, lubricated surfaces and/or air film separations have been used. However, any separation between the head and disc caused by such lubrication fluid or air film imposes a loss of signal and hence performance. A head/disc separation equal to one wave length could cause about 54.6 dB loss in the output of the replay head. Since it is desired to record wave lengths that approach 1.75 microns, the playback head voltage is reduced to 50% by only 0.19 micron of separation. On the other hand, as discussed above, reduction of separation to meet desired performance would cause the interface to be destroyed within a few seconds.

Prior art solutions to the head-to-disc interface problem have generally been of two types: flying heads in conjunction with rigid hard-surface discs and heads having large surface areas buried in soft flexible "floppy" discs. Flying head discs are very expensive and require complicated and expensive recording/playback systems. A flexible or so-called "floppy" disc reduces the handling and cost problems incurred in the flying head, rigid-disc systems. Some record/read heads for "floppy" discs are relatively large to provide an interface comprised of a large contoured head buried in the soft flexible media. The large record/read head surface area distributes the force per unit area to reduce media wear and separation loss. As the media is moved past the head, however, air collects between the head and disc surface to form an air film. The thickness of this air film is a function of head and media surface finishes, media stiffness, head-media penetration, head size, head surface contour, viscosity of the air and disc-head relative velocity. Because of these restraints, most flexible or "floppy" disc applications are limited to slow speed, low bandwidth digital computer applications or voice recording systems.

In information storage systems using rigid discs, catastrophic failures may occur due to the presence of small contaminants (on the order of 0.01 mm or 10 microns) which accumulate on the disc and head. These contaminants cause head crashes which result in permanent damage to the recording head, thereby necessitating head replacement. Floppy disc systems are also susceptible to catastrophic failures due to head crashes caused by the presence of small debris. Small pressure pads are often used in these floppy disc systems to remove debris and other contaminants. In information storage systems using compliant discs, catastrophic failures and head crashes are not so common because the disc is able to change shape to maintain good head to disc contact. One such system is shown in U.S. Pat No. 4,079,427. Nevertheless, debris may build up on a recording head which interferes with a laminar flow of air across the head and prevents the intimate head-to-disc contact required for effective recording and playback of information. This invention relates to an improved head cleaning cartridge and an apparatus for automatically executing a head cleaning routine.

SUMMARY OF THE INVENTION

It is therefore an object of the present invention to provide an improved technique for storing information on a flexible storage media.

Another object of the invention is to provide an improved system for magnetically storing information on a flexible magnetic recording disc.

A still further object of the invention is to provide a flexible magnetic storage disc cartridge which permits a high performance, narrow-track video magnetic head transducer to be used in contact with the magnetic disc.

It is another object of the invention to provide an apparatus which permits the precise recording and reproducing of wide bandwidth signals such as video signals using inexpensive flexible particulate-type recording media cartridges.

Another object of the invention is to provide a continuously replayable flexible magnetic storage media cartridge in which an air bearing of a preselected thickness between the head and media is maintainable regardless of head loading.

A further object of the invention is to provide a cartridge containing a recording media with a compliant, but resilient magnetic recording surface capable of withstanding shock, vibration and head crashes without media degradation.

A still further object of the invention is to provide an improved sytem for recording and reading information on a flexible information storage media over a wide range of vertical head alignments and special geometries.

Yet another object of the invention is to provide a relatively thin flexible magnetic recording media cartridge system with an improved uniform head-to-head coupling profile.

A still further object of the invention is to provide a head cleaning cartridge containing a flexible sheet of abrasive material for cleaning debris and other contaminants from the head.

Yet another object of the invention is to provide an information storage system with means for cleaning debris and other contaminants from the head to enhance the transfer of magnetic information between the head and disc.

Still another object of the invention is to provide an improved method and system for cleaning debris and other contaminants from the head.

These and other objects are accomplished in accordance with the present invention by providing a head-cleaning flexible sheet of abrasive material preferably contained within a cartridge for removing debris and other contaminants from the magnetic head transducer. The head cleaning cartridge has an opening for receiving a rotational means to impart rotational motion to the sheet of abrasive material and for allowing the recording surface of the head to contact the abrasive material and has a recess formed on an external portion thereof for mating with a sensor member in an information storage system. The sensor member indicates when the head cleaning cartridge has been inserted into the system. When the cartridge is inserted in the information storage system and the abrasive sheet is rotated, the head is moved back and forth across the surface of the abrasive sheet for a predetermined period of time, thereby removing debris and other contaminants therefrom. In one embodiment, sensor member is comprised of a switch means responsive to the insertion of a head cleaning cartridge for generating an electrical signal indicative thereof. The information storage system further includes means responsive to the electrical signal indicating that a head cleaning cartridge has been inserted for controlling the head to move back and forth along the sheet of abrasive material for the predetermined period of time. In another embodiment the information storage system includes means responsive to the switch means for disabling new information signals from being transmitted to the head while the head cleaning cartridge is installed.

In a preferred embodiment the head cleaning cartridge is of similar size and shape as cartridges containing information storage media except that the head cleaning cartridge has a small circular recess formed on a major surface thereof. The sensor switch means preferably includes first and second members which are in an open position and a closed position, respectively, when no cartridge is inserted. When the head cleaning cartridge is inserted, the first switch member is depressed, thereby closing a first electrical circuit and generating a first coded electrical signal. The second switch member, however, extends into the circular recess and remains in a released position, thereby keeping the second electrical circuit closed and generating a second coded electrical signal indicative thereof. The first and second electrical signals generated by the closed first and second electrical circuits indicate that a head cleaning cartridge has been inserted into the system.

The information storage system further includes digital processor means responsive to the first and second coded electrical signals for detecting the presence of a head cleaning cartridge and for executing a head-cleaning routine. The head-cleaning routine, which is comprised of moving the head back and forth across the surface of the abrasive material for a predetermined time such as 20 seconds to remove debris and other foreign matter. Since the sheet of abrasive material is compliant, it bends to conform to the curvature of the head, thereby effectively cleaning the entire recording surface, including the edges thereof.

BRIEF DESCRIPTION OF THE DRAWINGS

Still further objects and advantages of the invention will be apparent from the detailed description and claims when read in conjunction with the accompanying drawings wherein:

FIG. 6 is a bottom elevational view of the cartridge holder with a recording cartridge positioned therein showing the points of engagement of a motor rotational means with a central hub member affixed to the magnetic recording disc;

FIG. 7 is a top perspective view of a magnetic head transducer and a head positioning apparatus of the information storage system of the present invention;

FIGS. 9a and 9b are side elevational and top plan views, respectively, of the magnetic head transducer with a ramp member attached thereto;

FIGS. 10a–10c depict various views of the magnetic head transducer of the present invention;

FIGS. 11a and 11b are perspective views of the components comprising the magnetic head transducer of the present invention;

FIGS. 12a and 12b are cross-sectional views of a positioning apparatus and a grinding apparatus, respectively, for shaping the recording surface of the magnetic head transducer;

FIG. 13 is a top plan view of the magnetic recording disc of the present invention showing the disc divided into four annular quadrants;

FIG. 14 is a block diagram of the system used to vary the amount of write current supplied to the magnetic head transducer;

FIG. 16 is a graph showing the various electrical signals generated by the components of the head positioning system of FIG. 15;

FIG. 18b depicts the various electrical signals generated by the information erasing system of FIG. 18a;

FIG. 19b depicts front end views of the recording and head cleaning cartridges of FIG. 19a.

DETAILED DESCRIPTION OF A PREFERRED EMBODIMENT

The invention will be described in conjunction with a complete storage system for storing information on a magnetic recording disc. The information storage system described herein is preferably a high density digital information system suitable for storing large quantities of digital information in a small area.

General Description of the Information Storage System

Figure 1:
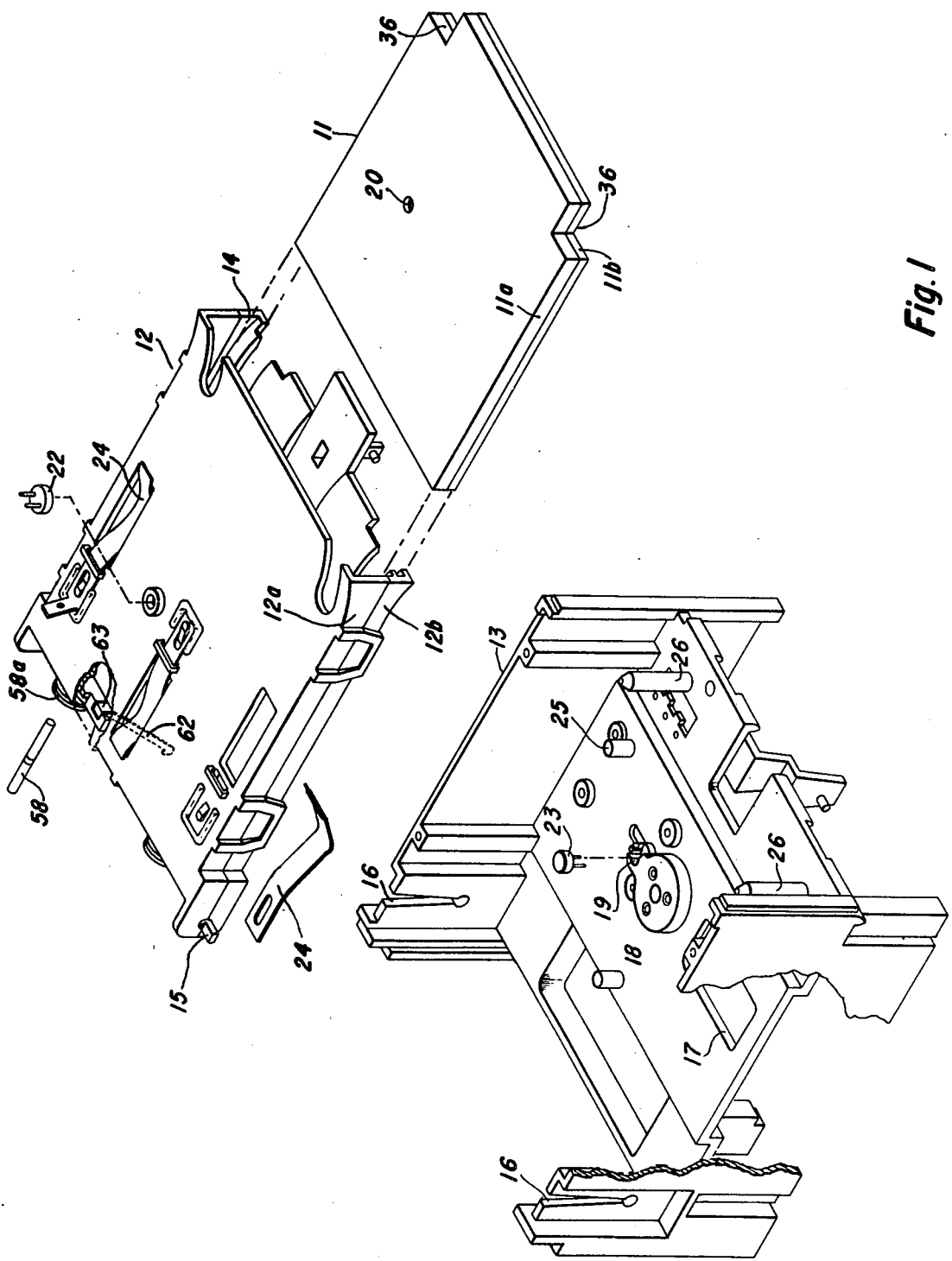
FIG. 1 is a perspective view of the information storage system of the present invention.

Refering to FIG. 1, cartridge 11, cartridge holder 12 and deck 13 are shown in perspective. Cartridge 11 is comprised of upper and lower cartridge members 11a and 11b, respectively, which snap together to form a protective housing for a flexible magnetic recording disc (not shown) contained therein. Holder 12 includes upper and lower holder members 12a and 12b which snap together to form a holder assembly for cartridge 11. Holder 12 is normally mounted in deck 13 by the engagement of extension members 15 (one of which is shown in FIG. 1) with vertical slots 16. During system operation, cartridge 11 is inserted into holder 12 through open end 14. Deck 13 functions as a base member for the information storage system and includes means for rotating the disc and reading and writing information thereon. When cartridge 11 and holder 12 are properly located in deck 13, openings 17, 18 and 19 are aligned with respective openings (not shown) in lower holder member 12b and in lower cartridge member 11b, thereby providing access to the magnetic recording disc for a magnetic head transducer and a rotational means such as a drive motor to engage the magnetic recording disc through openings 17 and 18, respectively.

Upper cartridge member 11a and upper holder member 12a include openings 20 and 21, respectively, which are in registration with opening 19 and and corresponding openings (not shown) in lower cartridge member 11b and lower holder member 12b when cartridge 11 and holder 12 are properly positioned in deck 13. A light emitting diode 22 is mounted in opening 21 for transmitting light energy through openings 20 and the corresponding opening in lower cartridge member 11b. A phototransistor 23 detects the rate at which light energy bursts emanate from cartridge 11 to determine the speed of rotation of the magnetic recording disc. Precise location of cartridge 11 with respect to openings 17, 18 and 19 of deck 13 is essential for effective operation of the system. Specifically, precise alignment of cartridge 11 in deck 13 is required for proper head-to-disc contact and for accurate positioning of the head on various tracks of the disc and also to permit the motor rotational means to engage the disc. Holder 12 includes means for maintaining cartridge 11 in a fixed position therein. Such means include springs 24 mounted on the upper holder member 12a for exerting downward pressure on cartridge 11 to hold cartridge 11 in a fixed position. Similarly, deck 13 includes means for properly aligning holder 12 and cartridge 11 and maintaining them in a fixed position. Such means include support members 25 and alignment posts 26. The means used for accurately and precisely locating the magnetic recording disc with respect to the head and motor rotational means are described in more detail below.

Figure 2A:
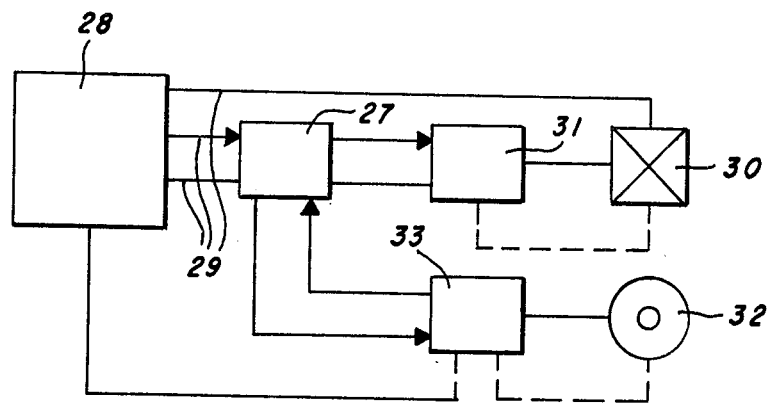
FIG. 2a is a block diagram of the electronic control system for the information storage system shown in FIG. 1.
Figure 2B:
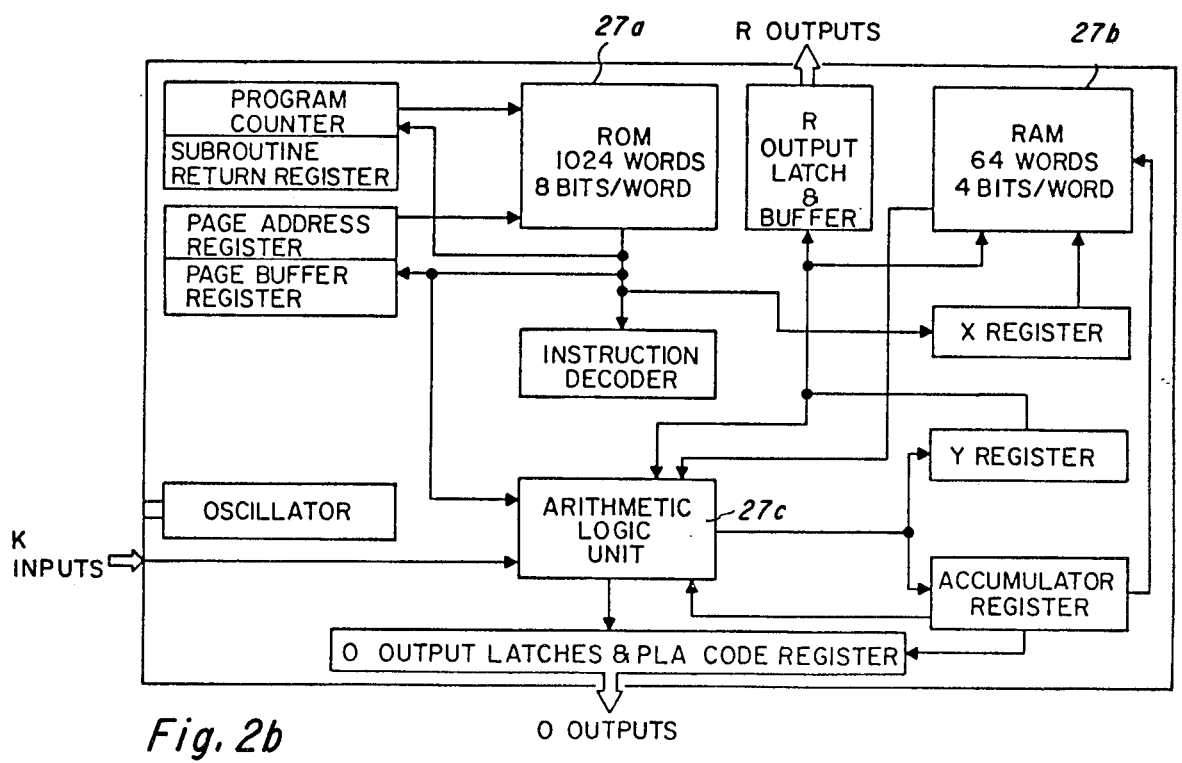
FIG. 2b is a block diagram of the components of a single chip microcomputer contained in the electronic control system of the present invention.

Located on the reverse side of deck 13, but not shown in FIG. 1, are the magnetic head transducer, motor rotational means, and the central control system for the information storage system. FIG. 2a shows the central control system and the interface with a host machine such as a computing apparatus from which information signals and commands are generated. The heart of the control system is digital processor 27, which is preferably a microcomputer of the TMS 1000 type, manufactured and sold as a standard product by Texas Instruments Incorporated and including a read-only-memory 27a, a random-access-memory 27b and an arithmetic logic unit 27c on a single semiconductor chip as shown in FIG. 2b. Digital processor 27 receives various command and data signals from host machine 28 and transmits various return signals to host machine 28 via interface 29. Digital processor 27 further includes means for preventing information signals from being transmitted to magnetic head transducer 30 by host machine 28. Digital processor 27 moves head 30 from one track location to another on the recording disc by selectively controlling a head positioning system 31 and receives a signal indicative of the position of recording head 30 at any given time from head positioning system 31. Head positioning system 31 includes a linear servomotor system for linerally moving head 30 across the disc and an optoelectronic system for providing feedback information on the actual position of recording head 30. Similarly, host machine 28 selectively activates motor rotational means 32 via motor controller 33 for providing rotational motion to the magnetic recording disc during the reading and writing of data on the disc. Digital processor 27 controls rotational means 32 when head 30 is being repositioned on disc 37. A separate optoelectronic system, including diode 22 and phototransistor 23, provides real time information indicative of the rotational speed of the magnetic recording disc. Data to be stored on the magnetic recording disc is transmitted as an information signal from host machine 28 to head 30 for storage on the disc. Data read from the disc by magnetic recording head 30 is transmitted back to host machine 28 via interface system 29. The operation of the control and interface system is described in further detail below.

Cartridge and Magnetic Recording Disc

The contents of cartridge 11 including the magnetic recording disc are shown in FIGS. 3a through 3d. Upper cartridge member 11a and lower cartridge member 11b of cartridge 11 are substantially rectangular in shape and include rectangular extension portions 35 which form 90 degree angle surfaces 36. Magnetic recording disc 37 is preferably of circular shape and is comprised of flexible plastic or film material with a magnetic flux-responsive coating positioned thereon. Disc 37 includes a plurality of information storage tracks concentrically arranged at predetermined distances thereon. The distance between the centerlines of adjacent tracks is preferably 0.254 mm (10 mils). During system operation, head 30 writes information on and reads information from selected tracks of disc 37. Hub 38 is affixed to the central portion of disc 37 for engaging motor rotational means 32 and transferring rotational motion to disc 37. Hub 38 further includes a latch member 39 projecting radially inward from projection member 40 for engaging a corresponding latch member on motor rotational means 32, as described in more detail below with reference to FIG. 6.

Also included in the central region of disc 37 are a plurality of openings 41 which are concentrically arranged and form part of the optoelectronic system used to measure the speed of rotation of disc 37. As previously mentioned with respect to FIG. 1, light emitting diode 22, positioned in opening 21 of cartridge holder 12, emits light energy which passes through openings 20 in upper cartridge member 11a and then, if one of openings 41 in disc 37 is aligned with opening 20, through corresponding opening 42 in lower cartridge member 11b and opening 73 (FIG. 4b) in lower holder member 12b, whereupon phototransistor 23 detects the light energy. Openings 41 in disc 37 are positioned with respect to openings 20 and 42 in cartridge 11 such that as the disc rotates, light energy will be received by phototransistor 23 as a series of intermittent light pulses at a frequency dependent upon the rotational speed of disc 37. When one of openings 41 is aligned with opening 20, light energy passes through cartridge 11 and is detected by phototransistor 23. Phototransistor 23 detects the intermittent bursts of light energy and transmits an electrical signal in synchronism therewith to digital processor 27, thereby permitting digital processor 27 to keep track of the rotational speed of disc 37 and hence the rate at which data is being written on or read from disc 37.

When cartridge 11 is assembled, disc 37 is positioned on interior major surface 43 of lower cartridge member 11b so that hub 38 is directly above opening 44. The perimeter of hub 38 is larger than the perimeter of opening 44 so that hub 38 and disc 37 are retained within cartridge 11. Upper cartridge member 11a and lower cartridge member 11b snap together to form a protective housing for disc 37 and hub 38. When disc 37 is rotated, interior major surface 43 functions as a smoothing plane therefor, i.e. air flows from the exterior of cartridge 11 through opening 44, causing disc 37 to rise slightly above interior major surface 43 on a cushion of air. Interior major surface 43 includes a slightly raised portion 45 having a radius of curvature of approximately six inches. Raised portion 45 provides added rigidity and stability to disc 37 by causing disc 37 to conform to the curvature thereof as disc 37 passes over raised portion 45 during rotation. This added stability is important in maintaining good head-to-disc contact and prevents disc 37 from "flying away" from head 30 when head 30 penetrates as much as 0.254 mm (10 mils) vertically toward disc 37. Since the remainder of lower interior major surface 43 is relatively flat, a thin cartridge configuration can also be used. In addition to increasing the stability and rigidity of disc 37, raised portion 45 causes disc 37 to conform more readily to the curvature of head 30 for more effective transfer of information signals between head 30 and disc 37. Lower cartridge member 11b further includes rectangular opening 46 with which head 30 is disposed in registration. Head 30 is positioned at selected track locations on disc 37 by movement along the major axis of rectangular opening 46. The reverse sides of disc 37 and hub 38 are mirror images of the sides shown in FIG. 3a, thereby enabling information to be recorded on either side of disc 37.

Figure 3A:
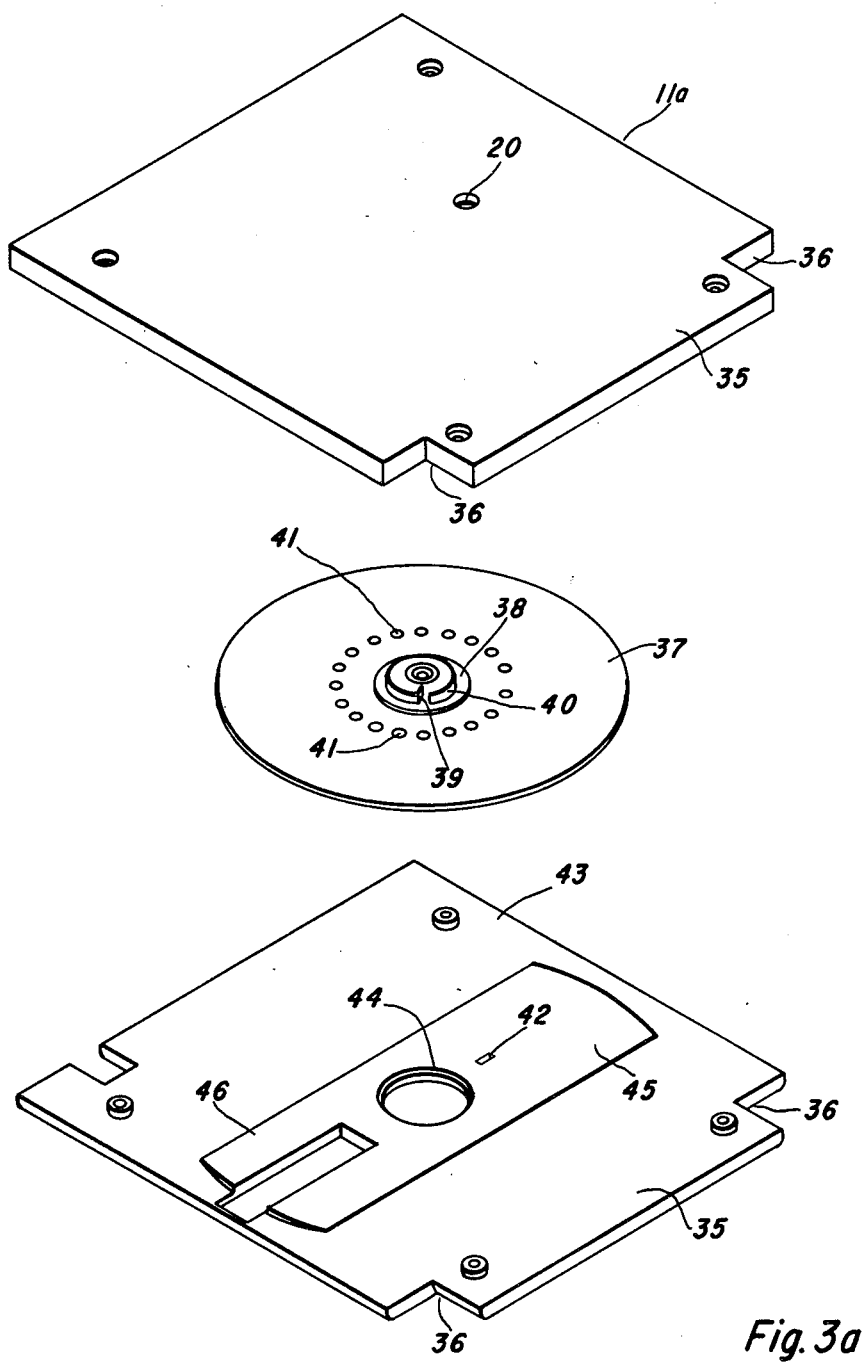
FIGS. 3a–3e show various views of a recording cartridge and magnetic recording disc of the present invention.
Figure 3C:
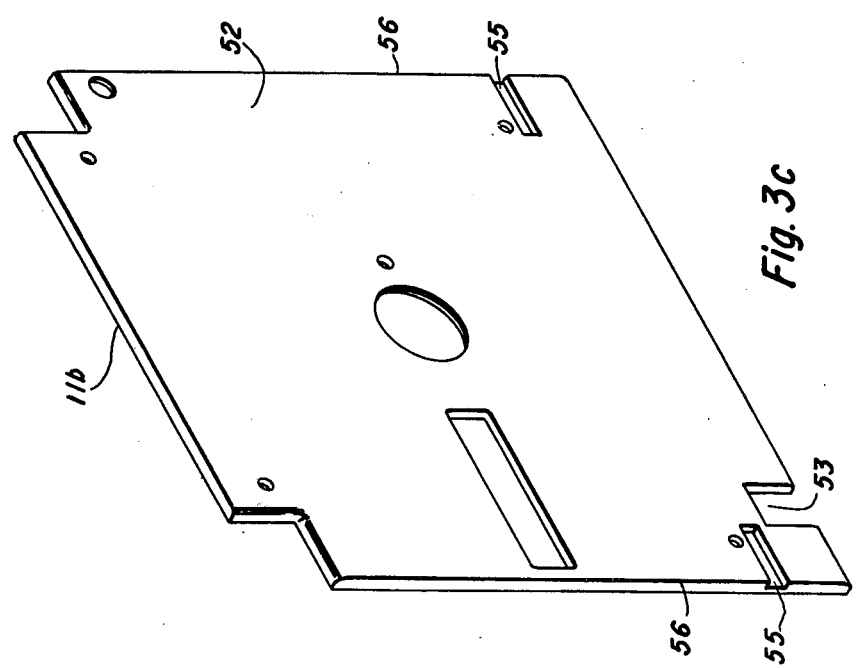
Figure 3D:
Figure 3B:
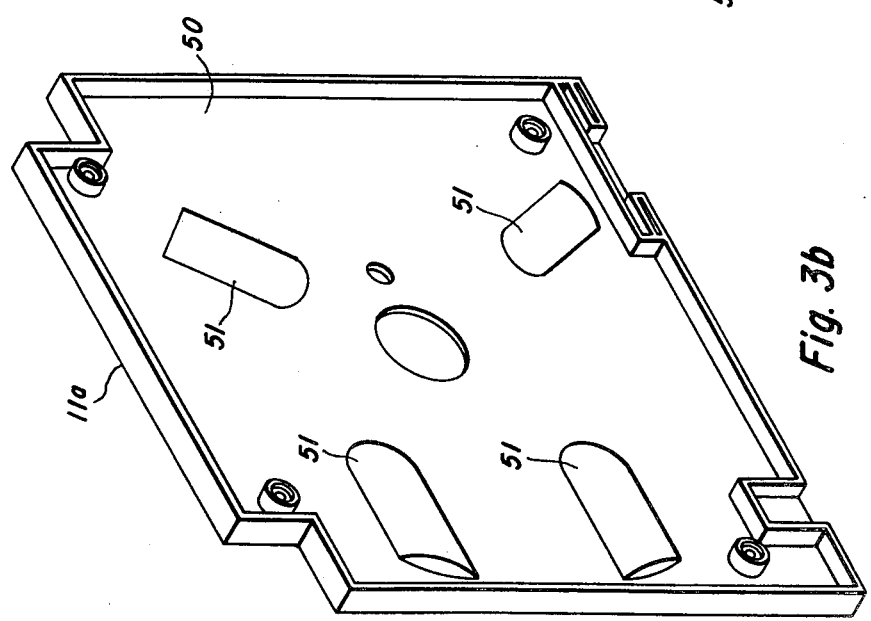

FIG. 3b shows interior major surface 50 of upper cartridge member 11a. Major surface 50 is a substantially flat, rectangular surface, punctuated by four hump-shaped members 51 extending therefrom. As disc 37 rotates, hump-shaped members 51 exert aerodynamic pressure on disc 37 to bias it toward head 30 to maintain good head-to-disc contact for effective system operation. Hump-shaped members 51 have smooth contoured surfaces with a radius of curvature of approximately 0.375 inches to eliminate vibration and flutter which can be transmitted to disc 37 and reduce the purity of video signals in particular. Hump-shaped members 51 compensate for changes in the enviromental conditions such as temperature and pressure within cartridge 11 and prevent deformation of disc 37 which can disrupt the transfer of information signals between head 30 and disc 37 by destroying the head-disc interface. As an added feature, interior major surface 50 and hump-shaped members 51 are coated with a conductive material to prevent electrostatic charge build-up on disc 37 and elsewhere within cartridge 11 during system operation.

FIG. 3c shows the alignment/positioning features contained on exterior major surface 52 of lower cartridge member 11b. Exterior major surface 52 includes a rectangular recess 53 extending perpendicularly inward from end wall 54 (FIG. 3d) and elongated rectangular slots 55 extending perpendicularly inward from opposite sides 56 of lower cartridge member 11b for mating with corresponding fixtures on cartridge holder 12.

To prevent information stored on disc 37 from being erased, a write protect switch having a slideable button 57 is mounted in recess 54a formed in end wall 54 as shown in FIG. 3d. Button 57 projects toward the mouth of recess 54a and is manually settable at first and second switch positions, representing the WRITE ENABLE and WRITE PROTECT states, respectively.

Figure 3E:
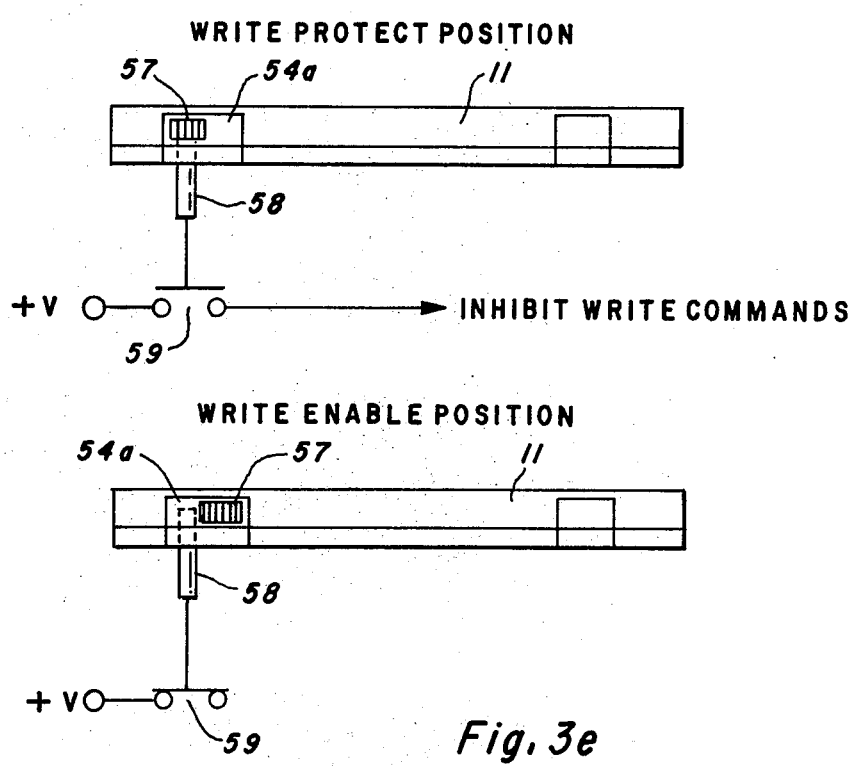

When cartridge 11 is inserted in holder 12, the write protect switch is in abutting relationship with a spring-loaded mechanical member 58 (see FIG. 1), which extends through opening 58a in holder 12. Referring to FIG. 3e, when button 57 is in the second position, it exerts biasing pressure on mechanical member 58 to open electrical circuit 59, which causes a WRITE PROTECT signal to be generated. The WRITE PROTECT signal inhibits the system from receiving further write commands from host machine 28 and from erasing information already recorded on disc 37.

Alternatively, to enable information to be erased and replaced with new information, button 57 is disengaged from mechanical member 58 and is shifted to the first (WRITE ENABLE) position, thereby releasing mechanical member 58, which protrudes into recess 54a. The releasing of button 57 closes electrical circuit 59 and terminates the WRITE PROTECT signal, thereby allowing information to be selectively erases and written over. The WRITE PROTECT switch permits the user to selectively protect the information on disc 37 from erasure or alternatively allow it to be erased.

Cartridge Holder and Deck Alignment Features

Figure 4A:
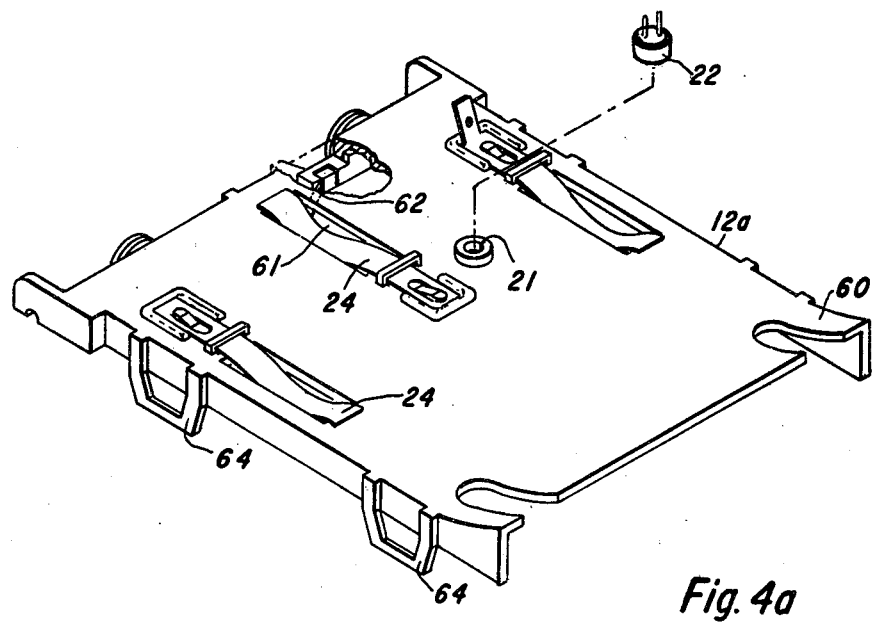
FIGS. 4a and 4b are perspective views of the upper and lower members of a cartirdge holder of the present invention.
Figure 4B:
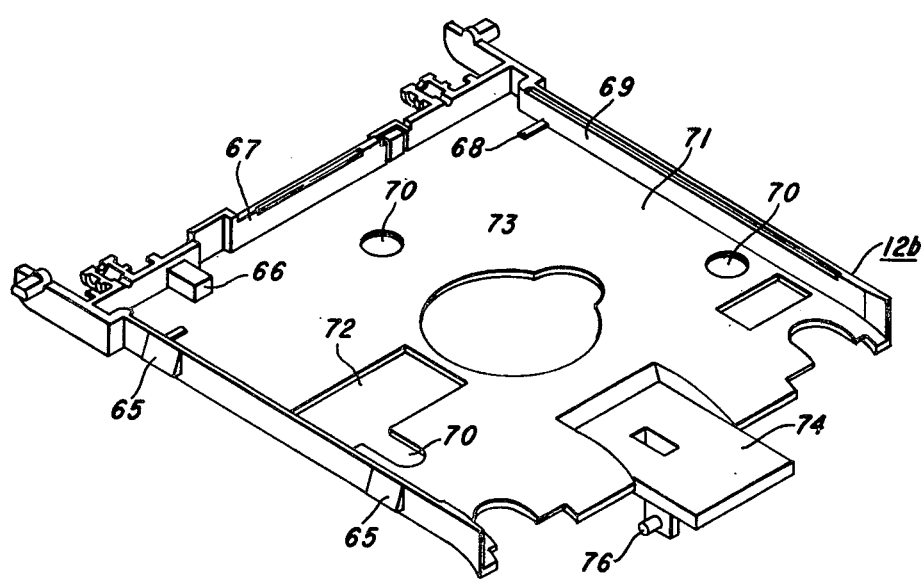

Referring to FIGS. 4a and 4b, upper holder member 12a and lower holder member 12b of cartridge holder 12 are shown in perspective. Major surface 60 of upper holder member 12a includes three openings 61, each having a spring member 24 inserted therein. When cartridge 11 is inserted in holder 12, springs 24 exert downward biasing pressure on cartridge 11 to keep it in a fixed position. Another spring member 62 (FIGS. 1 and 4a) is affixed to the interior end wall 63 of upper holder member 12a for exerting a forward biasing pressure on cartridge 11 to facilitate removal thereof. Upper holder member 12a further includes loop fasteners 64 attached to each side thereof for engaging projection members 65 on either side of lower holder member 12b and locking upper holder member 12a and lower holder member 12a together to form cartridge holder 12.

Lower holder member 12b includes a rectangular extension member 66 extending perpendicularly inward from end wall 67 and a pair of elongated detents 68 extending perpendicularly inward from opposite sides 69. When cartridge 11 is properly inserted in holder 12, rectangular extension member 66 mates with recess 53 on cartridge 11 and detents 68 mate with respective elongated slots 55 in cartridge 11 for maintaing cartridge 11 in a fixed position. Three openings 70 located in major surface 71 of lower holder member 12b allow support members 25 of deck 13 to extend therethrough and raise cartridge 11 slightly above major surface 71 during system operation. Suport members 25 cooperate with spring members 24 to position cartridge 11 vertically. Opening 72 is in registration with opening 17 in deck 13 and opening 46 in cartridge 11 for allowing access to disc 37 by head 30 and opening 73 is aligned with opening 18 in deck 13 and opening 44 in cartridge 11 for allowing motor rotational means 32 to engage hub 38 and rotate disc 37. Lower holder member 12b further includes a tongue-shaped member 74 which extends outwardly therefrom, tongue-shaped member 74 having a tab member 75 extending perpendicularly therefrom in a downward direction. Tab member 75 has a latch member 76 affixed thereto for engaging a corresponding latch member 80 (FIG. 5b) on deck 13 for securing cartridge holder 12 to deck 13.

Figure 5A:
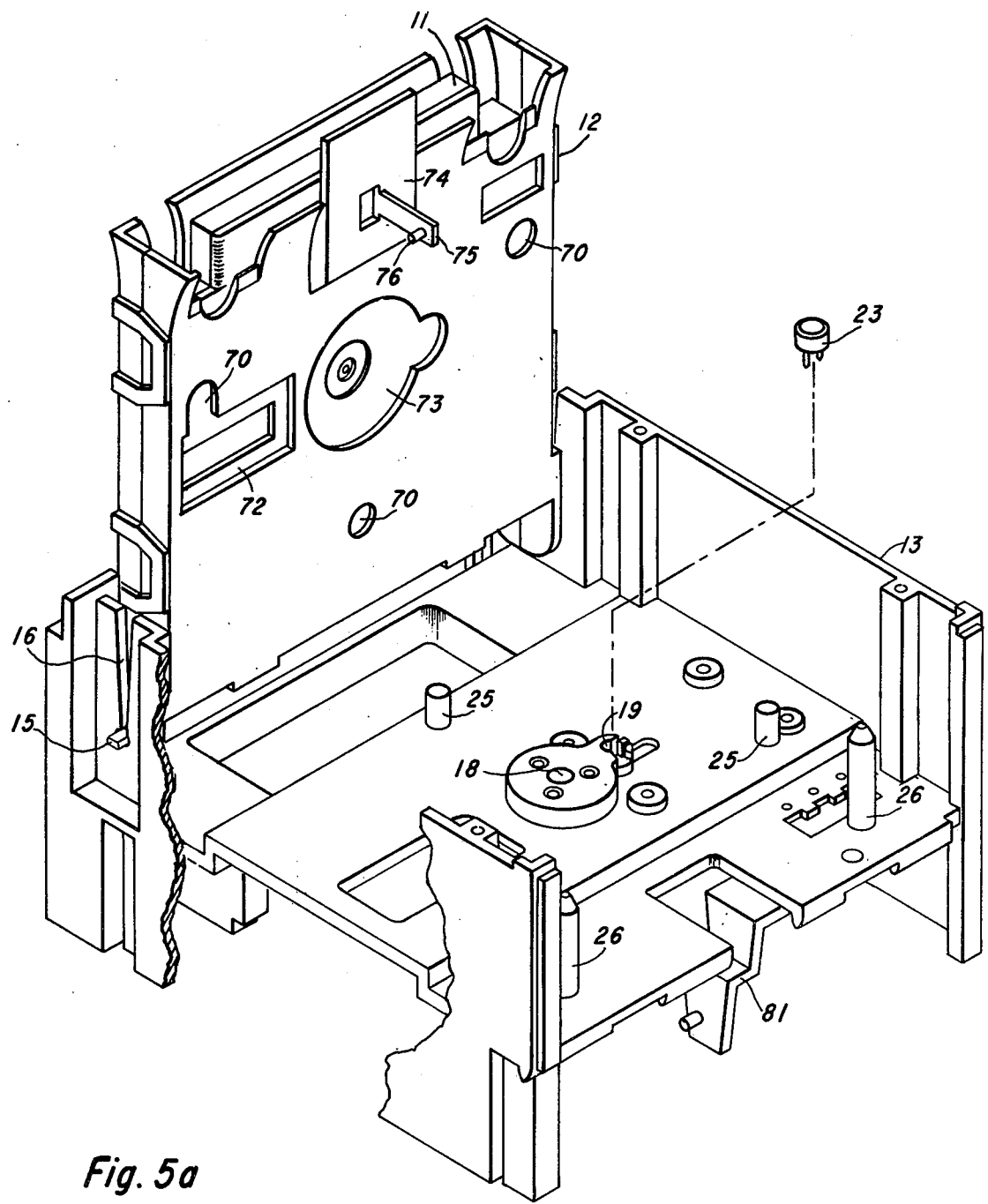
FIGS. 5a and 5b are perspective views of the cartridge holder positioned in the deck of the information storage system.
Figure 5B:
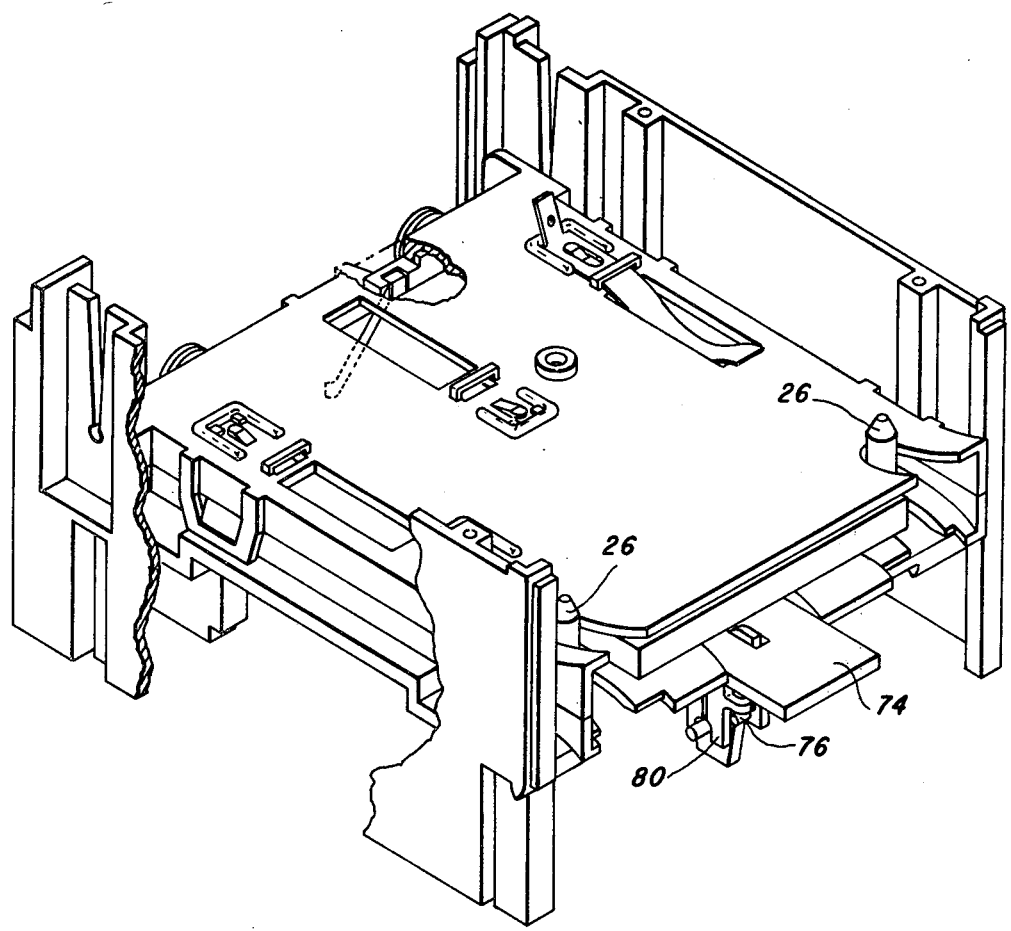

FIGS. 5a and 5b show cartridge holder 12, with cartridge 11 inserted therein, mounted in deck 13. It should be noted that cartridge 11 is insertable in holder 12 either before or after holder 12 has been mounted in deck 13. To insert holder 12 in deck 13, extension members 15 of holder 12 are inserted into slots 16. Holder 12 is then rotated 90° to a downward position as shown in FIG. 5b. When holder 12 is positioned in deck 13, support members 25 in deck 13 extend through openings 70 in holder 12 to raise cartridge 11 slightly above major surface 71 of lower holder member 12b. Additionally, as previously mentioned, openings 72 and 73 are aligned with openings 17 and 18, respectively, to ensure access to magnetic recording disc 37 by head 30 and motor rotational means 32, respectively. When holder 12 and cartridge 11 are properly positioned, alignment posts 26 are in abutting relationship with 90° angle surfaces 36 (FIGS. 1 and 3a) of cartridge 11. Deck 13 has an extension tab 81 on which latch member 80 is rotatably mounted for engaging latch member 76 of holder 12. Holder 12 is easily removeable by disengaging latch members 76 and 80 and rotating cartridge holder 12 90° back to the vertical position shown in FIG. 5a and then lifting holder 12 until extension member 15 are clear of vertical slots 16.

Referring to FIG. 6, when cartridge 11 and holder 12 are positioned in deck 13, motor rotational means 32 extends through opening 18 in deck 13 and opening 73 in holder 12 to engage hub member 38. Shaft 85 extends through opening 86 in hub 38 and end member 87 fits within circular projection member 40. Radial projection 88 extending outwardly from end member 83 engages latch member 39 extending inwardly from circular projection member 40 to impart rotational motion to hub 38 and disc 37. When latch member 39 and radial projection 88 are in mating engagement, the outer perimeter of end member 87 is in contact with the inner perimeter of projection member 40 at a point diametrically opposed to the engagement point of latch member 39 and radial projection 88. Thus end member 87 and hub 38 are engaged in the same position at all times, thereby providing greater accuracy in positioning disc 37 with respect to head 30. This unique coupling arrangement between hub 38 and motor rotational means 32 is described and claimed in allowed U.S. No. 4,216,511.

Recording Head and Head Positioning System

Figure 8A:
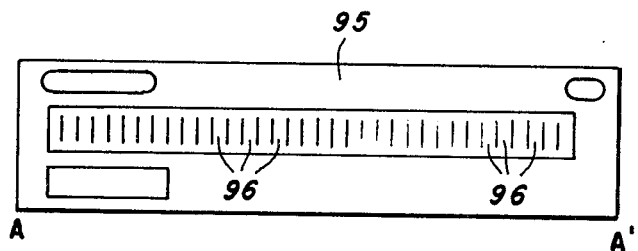
FIGS. 8a–8c are front elevational views of a shutter and mask assembly used to determine the position of the magnetic head transducer with respect to the disc.
Figure 8B:
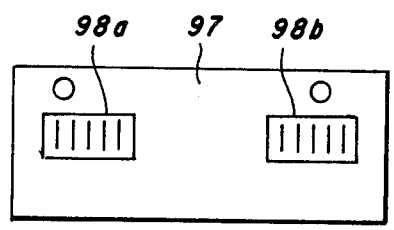
Figure 8C:
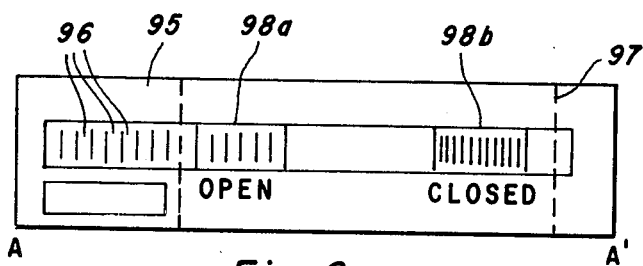
Figure 8D:
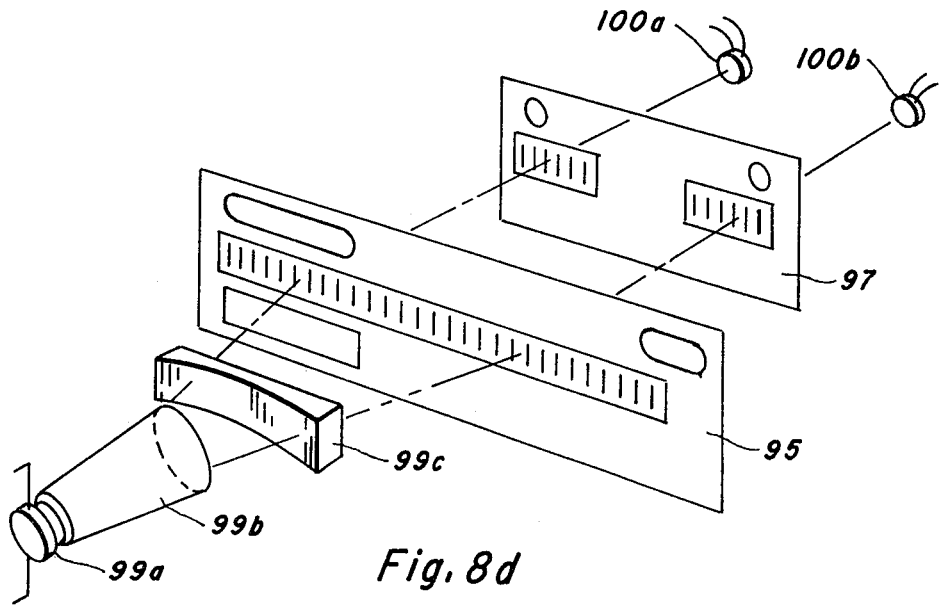
FIG. 8d is a perspective view of the optoelectronic system used to determine the position of the head transducer.

As shown in FIG. 7, magnetic head transducer 30 is mounted on slide assembly 92 which includes shafts 93 on opposite sides thereof. Slide assembly 92 is controlled by a linear servo-motor 94 which moves slide assembly 92 and head 30 horizontally along the axis connecting A—A'. Head 30 is positioned in registration with openings 17, 72 and 46 in deck 13, holder 12 and cartridge 11, respectively, so that movement of head 30 along the axis A—A' moves head 30 radially across disc 37. An optoelectronic system is used to determine the track location of head 30 at any given time. The optoelectronic system includes a shutter 95 which is attached to slide assembly 92 and is moved in a linear fashion along with head 30. As seen in FIGS. 8a, 8b and 8c, shutter 95 has a plurality of vertical apertures 96 arranged at predetermined distances along the major axis of shutter 95. Each aperture 96 is approximately 0.127 mm (5 mils) wide, the centerlines of adjacent apertures 96 being approximately 0.254 mm (10 mils) apart. The optoelectronic system further includes a stationary mask 97 as shown in FIG. 8b. Mask 97 includes first and second sets of apertures 98a and 98b, respectively. As shutter 95 moves back and forth with respect to stationary mask 97, apertures 96 are oriented in various positions with respect to first and second sets of apertures 98a and 98b so that selected apertures of mask 97 are lined up with selected apertures 96 of shutter 95, thereby permitting light energy generated by a light-emitting diode 99a to pass therethrough, while other apertures of mask 97 are not lined up with any of apertures 96 of shutter 95 and are therefore blocked off by the solid portions of shutter 95 so that light energy cannot pass therethrough. A cone-shaped member 99b and lens 99c focus the light energy emitted by 99a to provide a collimated light source. Light energy which passes through apertures 98a and 98b is detected by a pair of light sensitive diodes 100a and 100b, respectively, which generate respective electrical signals indicative of the number of open apertures of each set 98a and 98b. The system is responsive to these signals for generating an AC electrical signal indicative of the relative position of head 30 with respect to a particular track on disc 37 as shown in FIG. 16. Specifically, when head 30 is positioned at one extreme of a particular track, all of the apertures in the first set of apertures 98a are aligned with apertures 96, thereby permitting light to pass through, while all of the apertures in the second set of apertures 98b are blocked off by shutter 95 so that no light energy passes through. FIG. 8c shows shutter 95 positioned so that all of the apertures of first set 98a are open while all of the apertures of second set 98b are closed, thereby indicating that head 30 is located at one extreme of a particular recording track. At the other extreme of the track, the opposite is true, i.e. all of the apertures of first set 98a are blocked off while all of the apertures of the second set 98b are open for light to pass through. When head 30 is at the center of the track, approximately half of the apertures of each of the sets of apertures 98a and 98b are open for light to pass through while the other half are closed off to light passage. As head 30 is moved radially across disc 37, an AC electrical (see, for example, FIG. 16) signal is thereby generated indicative of the position of head 30 at any given time. In a unique feature of the optoelectronic system just described, shutter 95 and mask 97 comprised of essentially the same plastic material as disc 37. This enables the position of head 30 with respect to disc 37 to be determined with greater precision by compensating for environmental pertubations, such as changes in temperature and pressure, to which disc 37 is subject and which cause disc 37 to expand and/or contract. Shutter 95 and mask 97 are preferably formed by cutting a piece of the plastic material at an angle of approximately 45° with respect to the manufacturing length of the plastic material. This is due to the fact that the thermal and hygroscopic expansion coefficients of the plastic material are different along the length of the material from the corresponding coefficients along the width of the material. The thermal and hygroscopic expansion coefficient of shutter 95 and mask 97 represent averages of these coefficients along both axes of the material and thus are closer to the average coefficients of cicular disc 37, which is formed from the same material. In addition, the thermal and hygroscopic time constants of shutter 95, mask 97 and disc 37 are essentially the same. For optimum performance, the end of shutter 95, which is positioned away from head 30 is unbonded and free to move parallel to the direction of movement of slide assembly 92. In one embodiment, performance is further enhanced by bonding mask 97 near the center of disc 37. Mask 97 is free to expand and contract away from the bonded area, parallel to the movement of slide assembly 92.

FIGS. 9a and 9b illustrate another unique feature of the information storage system descibed herein. Magnetic head transducer 30 is affixed to ramp member 101 having an inclined surface sloping downward at a 45° angle away from head 30. Ramp member 101 is positioned between head 30 and the geometric center of disc 37. When the information storage system is not in operation, head 30 is normally positioned away from disc 37 and outside of the perimeter thereof. When head 30 is moved radially toward disc 37 for reading and/or writing data thereon, the perimeter of disc 37 first contacts ramp member 101 at the lower end of the inclined surface and is lifted up and over the top of head 30. This prevents damage to disc 37 due to collision with head 30 as head 30 is moved along the disc. Furthermore, the use of ramp member 101 to move disc 37 vertically into position with respect to head 30 eliminates the need for an additional electromechanical system such as a solenoid device or servo system for moving head 30 vertically with respect to disc 37 when head 30 is repositioned. Therefore, head 30 need only be moved linearly along disc 37 during system operation.

As shown in FIGS. 10a, 10b and 10c, magnetic head transducer 30 is comprised of a relatively thin (0.20 mm or 8mils) slice of ferromagnetic material and is of substantially rectangular shape with a curved upper recording/playback surface 111. Head 30 is approximately 4.06 mm (160 mils) wide in the direction X—X' and approximately 3.43 mm (135 mils) long in the direction Y—Y'. Positioned approximately 0.76 mm (3 mils) below the apex of recording surface 111 is a circular opening 112 which is approximately 0.20 mm (8 mils) in diameter. Electrical coil 113 is wrapped around head 30 in the direction X—X' and passes through opening 112. Coil 113 is supplied with electrical current to magnetically bias recording head 30 for recording and playback of data on disc 37. Extending along the axis Y—Y' is a thin gap (1 micron) which is comprised of front and rear gaps 114a and 114b, respectively. Front gap 114a extends from the apex of curved surface 111 to the top of opening 112 and rear gap 114b extends from opening 112 down to the base 115 of head 30. As part of the manufacturing process for head 30, non-magnetic material is deposited in gaps 114a and 114b to form a transducing gap. The process used for fabricating head 30 is described in detail below.

Recording surface 111 preferably has a radius of curvature of essentially one inch along its major axis and one-half inch along its minor axis for optimum transfer of the informatin signal between head 30 and disc 37 while minimizing the amount of wear on disc 37. During recording and/or playback of information, a thin film of air of approximately 0.5 microns operates between recording surface 111 and disc 37 to prevent wear on disc 37, but allow an intimate head-to-disc interface. Disc 37 is flexible enough to move vertically in response to head penetrations into disc 37, but is rigid enough not to "fly away" from head 30 when head 30 penetrates as much as 0.254 mm (10 mils) toward disc 37. An intimate head-to-disc relationship, which is critical for effective system performance, is maintained over a wide variety of head penetrations and alignments. To further enhance signal transfer between head 30 and disc 37, disc 37 bends slightly as it passes over head 30 to conform more closely to the curvature of recording surface 111. As shown in FIG. 10c, however, disc 37 has a lesser curvature than head 30 so as to prevent the edges of head 30 from digging into disc 37.

Referring to FIGS. 11a and 11b, head 30 is comprised of first and second opposed confronting ferromagnetic pole pieces 121 and 122, respectively. Pole pieces 121 and 122 have opposing major surfaces 123 and 124, respectively, which are divided into front gap faces 123a and 124a, respectively, and rear gap faces 123b and 124b, respectively. The front and rear gap faces of pole pieces 121 and 122 are separated by a complementary recess 125, which forms opening 112 when pole pieces 121 and 122 are affixed together.

To form the transducing gap, a non-magnetic material is formed on front gap faces 123a and 124a at a thickness equal to the desired thickness of the transducing gap and a brazing alloy is deposited on rear gap faces 123b and 125 b at a thickness of five to ten percent greater than the thickness of the non-magnetic material. It will be evident to those skilled in the art that the non-magnetic material and brazing alloy may be deposited in a variety of ways. One method of depositing the non-magnetic material involves the deposition of a gas which contains the non-magnetic material on front gap faces 123a and 124a. Other methods of depositing the non-magnetic material include vacuum deposition using direct current or radio frequency sputtering. The non-magnetic material is deposited at a thickness between 0.5 micron and 5 microns, preferably at a thickness of approximately 1 micron. Alternatively, front gap 114a may be formed mechanically by positioning a non-magnetic shim of a thickness equal to the desired width of the transducing gap between front gap faces 123a and 124a.

The brazing alloy, which is comprised of silver, copper and praedium, is preferably deposited on rear gap faces 123b and 124b by RF sputtering, which is well known in the art. In RF sputtering pole pieces 121 and 122 are positioned in a vacuum chamber and a target comprised of brazing alloy material is positioned thereabove. A stream of inert gas, such as Argon, is passed across the target and a DC potential or a potential varying at a radio frequency rate is maintained at the surface of the target, thereby producing an ionsheath near the target surface. Ions in the sheath strike the target surface and cause a sputtering of the brazing alloy material by momentum transfer, thereby depositing the material on rear gap faces 123b and 124b This process can be adjusted to ensure that the desired thickness of brazing alloy material is deposited. Pole pieces 121 and 122 are secured together with opposing major surfaces 123 and 124 in abutting relationship and heated to the melting temperature (850° C.) of the brazing alloy to intimately affix pole pieces 121 and 122 together to form an integral block piece 126. Block piece 126 is then sliced transversely along an axis B—B' to form a plurality of magnetic head transducers 30, each having a predetermined thickness. It is important that the brazing alloy be deposited at a thickness which is at least five percent greater than the thickness of the non-magnetic material deposited on the front gap faces 123a and 124a to compensate for the loss of a certain amount of the brazing alloy from leakage and absorption during the brazing process. The result of this process is the production of a magnetic head transducer 30 which has a uniform gap width along the entire length of head 30 and concomitant reduction in the mechanical stress on front and read gaps 114a and 114b. Heads 30 fabricated using this process have greatly enhanced signal output performance (4–6 db improvement in the output signal voltage) as compared to head transducers formed using prior art methods in which the non-magnetic material and brazing alloy were deposited at an equal thickness on the gap faces. This results in better fidelity of the recorded signals and less susceptibility of the information storage system to noise and other interference.

After one or more magnetic head transducers 30 have been sliced from block 126, recording surfaces 111 must be shaped to form the required one inch radius of curvature thereon. A unique lap and tool method is used to precisely contour large quantities of heads 30 so that all of the heads 30 have a uniform shape. Individual heads 30 are secured to respective flat surfaces on a cone-shaped holder 131 as depicted in FIGS. 12a and 12b and holder 131, with heads 30 attached thereto, is placed in a hemispherical positioning tool, such as transfer block 132, having a concave surface 133 with a radius of curvature of one inch. Selected flat surfaces of holder 131 are oriented so that they lie in planes which are perpendicular to other flat surfaces on holder 131. Spacer means 134 is provided to retain holder 131 in a predetermined position in transfer block 132 so that recording surfaces 111 of heads 30 are tangent to concave surface 133 and in abutting relationship therewith. The orientation of heads 30 with respect to concave surface 133 is further adjusted by sliding heads 30 along their respective flat surfaces until the desired position is achieved.

When each head 30 is properly positioned, the axis Y—Y' extending along the length of head 30 (FIG. 10a) is substantially orthogonal to both recording surface 111 and concave surface 133. Furthermore, when heads 30 are properly positioned, the axis Y—Y' extending through a pair of heads 30 which are affixed to mutually perpendicular flat surfaces form one inch legs of an isosceles right triangle having a base of 1.414 inches extending between the respective points of intersection of the two heads 30 with concave surface 133 as shown by dotted lines in FIG. 12a. Therefore, spacer means 134 can be used to properly position heads 30 by adjusting the position of holder 131 and heads 30 so that the aforementioned points of intersection are 1.414 inches apart.

When heads 30 are properly positioned, holder 131 is removed and positioned in a rotatable hemispherical grinding apparatus 135 having a concave surface 136 with a one inch radius of curvature so that recording surfaces 111 of heads 30 are in abutting relationship therewith. Heads 30 are held in a fixed position while concave surface 136 is rotated by motor 137, thereby mechanically grinding recording surface 111 to form approximately the desired one inch contour thereon. To further refine the contouring, recording surface 111 is polished by a series of rotatable hemispherical polishing tools, each having a concave surface with a one inch radius of curvature, in a manner similar to that described with respect to grinding apparatus 135. This provides more precise contouring of recording surface 111 and removes rough spots and other irregularities theron. The above-described lap and tool method is effective in forming large quantities of precisely contoured magnetic head transducers 30 having uniformly contoured recording surfaces 111. Heads 30 contoured using this method are suitable for use in high performance, high density information storage systems such as the system disclosed herein.

In a further feature of the unique information storage system, recording of information signals is accomplished with fewer errors by varying the write current supply to recording head 30 in dependence upon the particular recording track on which data is being recorded. Magnetic recording disc 37 is divided into four quadrants, RW1, RW2, RW3 and RW4, beginning at the perimeter and moving radially inward to the center, as shown in FIG. 13. The first quadrant is comprised of tracks 0–20, the second, tracks 21–40, the third, tracks 41–60 and the fourth, tracks 61–79. As shown in FIG. 14, host machine 28, such as a computing system, determines the particular track on which data is to be recorded and sends a nine bit TRACK COUNT signal to digital processor 27 selecting the particular track on which data is to be written. In response thereto, digital processor 27 sends a TRACK CLOCK signal back to host machine 28 indicating it has received one bit of the TRACK COUNT signal. Digital processor 27, after positioning head 30 on the particular track, determines the particular quadrant in which the track is located and generates an output signal on one of four output lines R5, R6, R7 and R8 to turn on a selected one of four switching transistors 143a, 143b, 143c and 143d.

Each transistor has a respective resistor 144a, 144b, 144c and 144d, each having a discrete resistance value, in series therewith for varying the current input to recording amplifier 145. Transistors 143a, 143b, 143c and 143d, together with their associated resistors 144a, 144b, 144c and 144d, provide four parallel electrical paths connecting power supply 146 with head 30. The particular electrical path which is activated by digital processor 27 is a function of the quadrant in which the selected track is located. Transistor 143a is turned on whenever the selected track is located in the first quadrant, i.e. tracks 0–20, transistor 143b is turned on when the selected track is located in the second quadrant comprising tracks 21–40 and so forth. For example, if computing system 28 selects track 17 on which to write data, digital processor 27 sends an output signal via output terminal R5 to turn on transistor 143a and allow current to pass therethrough and through resistor 144a to recording amplifier 145 and thence to head 30. Amplifier 145 coverts the DC voltage supplied by power supply 146 to an AC voltage supply for head 30. The informatin to be recorded on disc 37 is transmitted directly from host machine 28 via amplifier 145 to head 30. If, on the other hand, host machine 28 selects track 35, which is in the second quadrant, digital processor 27 activates switching transistor 143b which allows current to flow therethrough and through resistor 144b to amplifier 145 and head 30. Because resistor 144b has a different resistance value from resistor 144a, the current supplied to head 30 for writing information on track 35 is different from that supplied to head 30 when information is being written on track 17.

Optimum performance is obtained by supplying the greatest amount of write current to head 30 when data is being recorded on tracks in the first quadrant (the outermost tracks 0–20). This is due to the fact that the outer portion of magnetic recording disc 37 is moving at a greater velocity than the inner portion and therefore the data density is less on the outside tracks when the rate at which data is recorded is constant. When the data density is decreased, a given amount of data is being distributed over a large annular region of disc 37. The outer tracks are therefore more susceptible to the occurrence of inflection points, which produce errors in the information signal. On the inner tracks, such as, for example, tracks 61–79 in the fourth quadrant, the data density is greater than on the outside tracks so that inflection points are less likely to occur. Therefore, a lesser amount of write current supply is required. The write current is therefore varied as a function of track location by choosing the resistance values so that resistor 144d has the largest resistance to ensure that the innermost tracks (fourth quadrant) receive the least amount of write current and resistor 144a has the least resistance to ensure that the outermost tracks (first quadrant) receive the greatest amount of write current. This arrangement not only reduces errors in the information signal, but also provides improved system fidelity and enables a single head 30 to be used for recording, playback and erasure.

Figure 15:
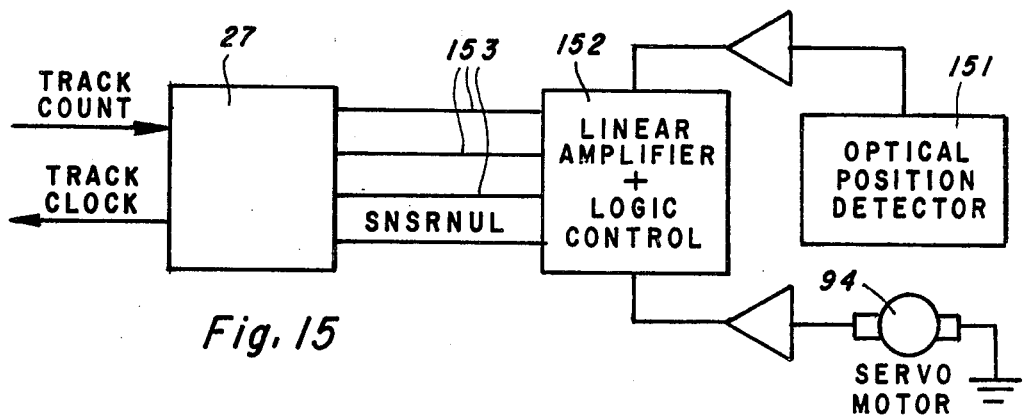
FIG. 15 is a block diagram of the system used to position the head transducer with respect to the magnetic recording disc.

The system depicted in FIG. 15 expedites the movement of head 30 from one track to another on disc 37 and maintains head 30 in a predetermined position with respect to the centerline of a selected track. Movements of head 30 are optically detected by optoelectronic system 151, which generates an AC signal indicative thereof, as shown in FIG. 16. The zero crossing points of the signal at the 0 and 10 positions on the horizontal axis of FIG. 16 correspond to the respective centerlines of adjacent tracks of disc 37. The vertical axis represents the voltage amplitude of the signal. When the amplitude of the AC signal reaches a threshold value, $V_t$, linear amplifier and logic control circuit 152 generates a SNSRNUL signal until the amplitude drops below the threshold value.

Digital processor 27 controls the repositioning of head 30 from one track to another by generating a series of ACCELERATION and DECELERATION control signals via loop state control lines 153. Analog amplifier 152 is responsive thereto for controlling linear servomotor system 94 to move head 30 in accordance with the ACCELERATION and DECELERATION signals from one position to another along disc 37. The repositioning sequence is begun when host machine 28 transmits a TRACK COUNT signal indicative of a selected track location to digital processor 27, which computes the number of tracks between the present location of head 30 and selected track location and the direction in which head 30 must be moved. If head 30 is to be moved to a position at least 16 tracks away from its present location, head 30 is first moved in one eight-track increment and then in single track increments for the remaining eight or more tracks up to a maximum of 15 single track increments. If head 30 is to be repositioned fewer than 16 tracks, it is moved in single track increments only. Digital processor 27 is programmed so that whenever head 30 is moved one or more increments of eight tracks each the eight track increments are followed by at least eight, but not more than 15 single track increments. The relationship between the number of tracks which head 30 must traverse and the number of eight-track increments through which head 30 is moved to arrive at the selected track is expressed as follows:

$$(M+1) \cdot 8 \leq N < (M+2) \cdot 8$$

N = total number of tracks head 30 must negotiate
M = number of eight track increments through which head 30 is moved. Thus head 30 is moved M increments of eight-tracks each when N is greater than or equal to $(M+1) \cdot 8$.

Figure 17A:
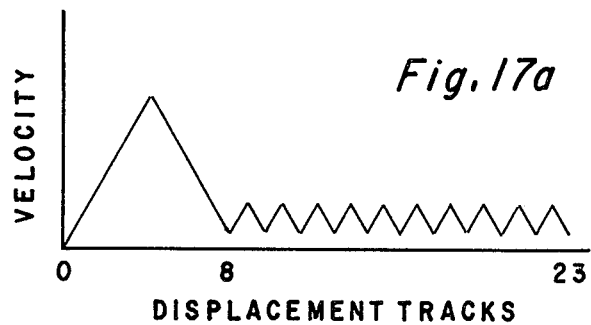
FIGS. 17a and 17b are graphs showing the velocity of the head transducer as a function of the displacement along the disc.
Figure 17B:
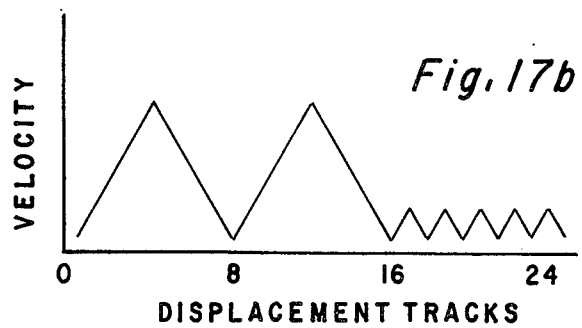

For example, if head 30 is to be moved from track 5 to track 28 (23 tracks), it will be moved in one eight-track increment followed by 15 single track increments, as shown in FIG. 17a. However, if head 30 is to be moved 24 tracks, from track 5 to track 29, head 30 will be moved in two eight-track increments followed by eight single track increments, as shown in FIG. 17b.

FIG. 16 shows the relationship of the ACCELERATION and DECELERATION signals generated by digital processor 27. When head 30 is being moved in single track increments, the ACCELERATION signal is generated for approximately one-half of each track, followed by the DECELERATION signal for the other half. This causes head 30 to alternately accelerate and decelerate across each track, resulting in the small sawtooth velocity patterns shown in FIG. 17. When head 30 is being moved in an eight-track increment, the ACCELERATION signal is generated for approximately 4.5 tracks, followed by the DECELERATION signal for the remaining 3.5 tracks. This results in the large sawtooth velocity patterns of FIG. 17.

By moving head 30 in one or more increments of eight tracks each, head 30 is repositioned faster on selected tracks, thereby improving system response time. Those skilled in the art will appreciate that digital processor 27 may be programmed to move head 30 in multi-track increments other than eight-track increments.

When head 30 is in position on a selected track, analog amplifier 152 maintains head 30 within a predetermined region on either side of the centerline of the recording track. Analog amplifier 152 is responsive to the AC position signal generated by optoelectronic system 151 for generating a restoring force to return head 30 to its centerline or home position. The farther head 30 strays from the centerline, the greater the amplitude of the AC position signal and the greater the restoring force. Preferably, head 30 is constrained to move within a 0.025 mm (1 mil) region on either side of the centerline. When head 30 deviates one mil or more from the centerline, analog amplifier 152 generates a SNSRNUL signal which causes digital processor 27 to go into an ERROR routine, thereby preventing further recording or playback of data while returning head 30 to its proper position.

Figure 18A:
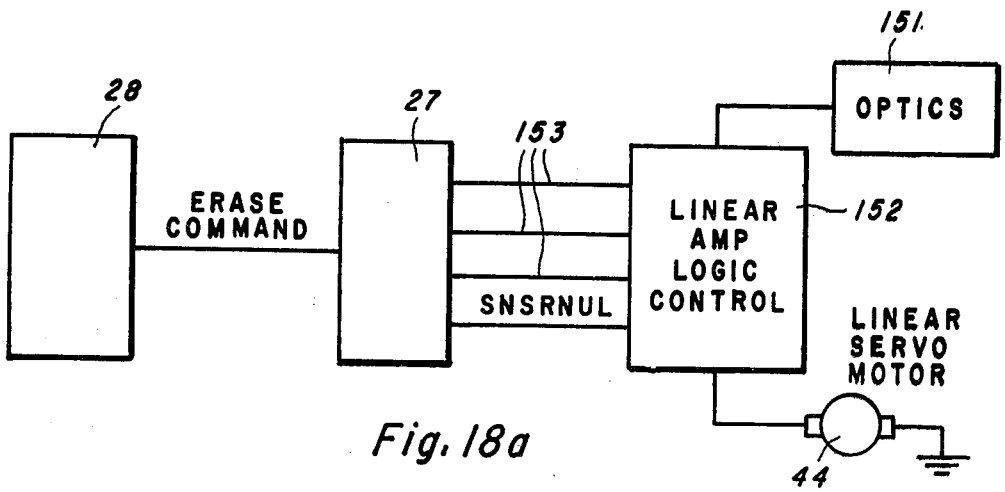
FIG. 18a is a block diagram of the system used for erasing information from the disc.

When it is desired to erase information from a particular track on disc 37, host machine 28 transmits an ERASE command signal to digital processor 27 as shown in FIG. 18a. Because each recording track is only 0.203 mm (8 mils) wide, head 30 cannot effectively erase the entire area of the track if it remains positioned at the centerline.

To ensure that all remnants of the information signal are erased, digital processor 27, in response to the ERASE command signal (ERASE=0), generates LEAN A and LEAN B control signals (FIG. 18b), each of which is transmitted as a three bit binary coded signal via loop state control lines 153 to analog amplifier 152. The LEAN A and LEAN B signals introduce position biasing signals of +1 volt and −1 volt, respectively, into the control loop, thereby causing analog amplifer 152 to maintain head 30 at a position which is offset a distance of 0.025 mm (1 mil) from the centerline of the track on either side thereof. When either the LEAN A or LEAN B signal is being generated, the threshold of the SNSRNUL signal is raised from 1 volt to 1.5 volts, which is equivalent to raising the maximum displacement of head 30 from 0.025 mm (1 mil) to 0.38 mm (1.5 mils). This prevents the SNSRNUL signal from going high and triggering the ERROR routine when head 30 is moved or "leaned" to the offset positions for erasing information.

Figure 18C:
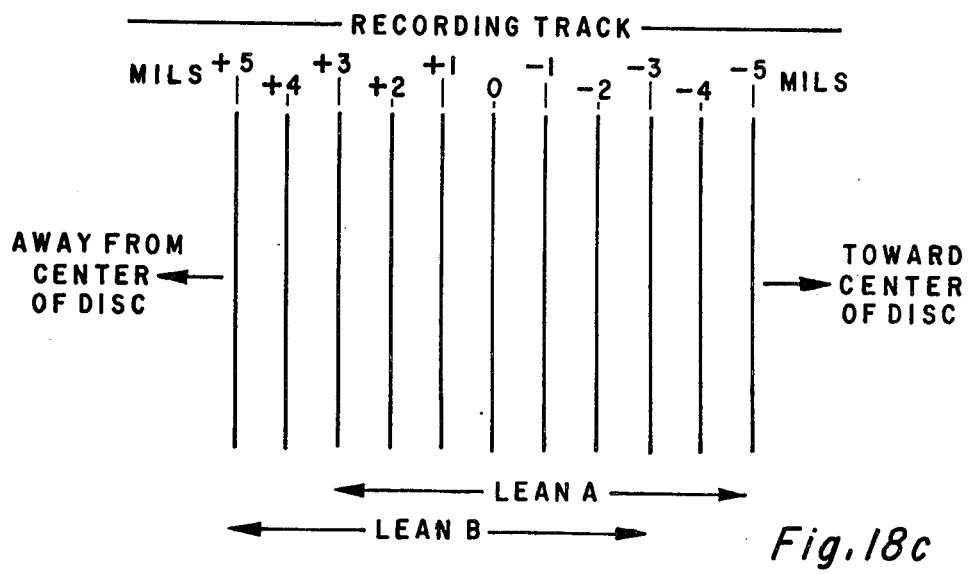
FIG. 18c shows the relative positions of the head transducer with respect to the centerline of a recording track where information is being erased.

When the LEAN A signal is generated, head 30 is displaced 0.025 mm (1 mil) from the centerline position (zero position in FIG. 18c) in a direction toward the geometric center of disc 37 so that head 30 is centered at the −1 mil position. A 3 MHz electrical signal is then supplied to head 30 to erase information in an 0.8 mil (0.203 mm) wide region between the −5 mil and +3 mil positions. When the LEAN B signal is transmitted, head 30 is displaced in a direction away from the geometric center of disc 37 to the +1 mil position. The 3 MHz erase signal is again applied to head 30 to erase information in the 8 mil wide band between the −3 mil and +5 mil positions. Thus the entire 10 mil (0.254 mm) wide recording track is eraseable using this technique. If head 30 strays 1.5 mils (0.038 mm) or more from the centerline, the SNSRNUL signal goes high which activates the ERROR routine to prevent head 30 from erasing information on adjacent tracks.

When the ERASE command signal goes low (ERASE=1), digital processor 27 outputs a TRUENUL instruction via loop state control lines 153 to return head 30 to its centerline position and normal operation is resumed.

Figure 19A:
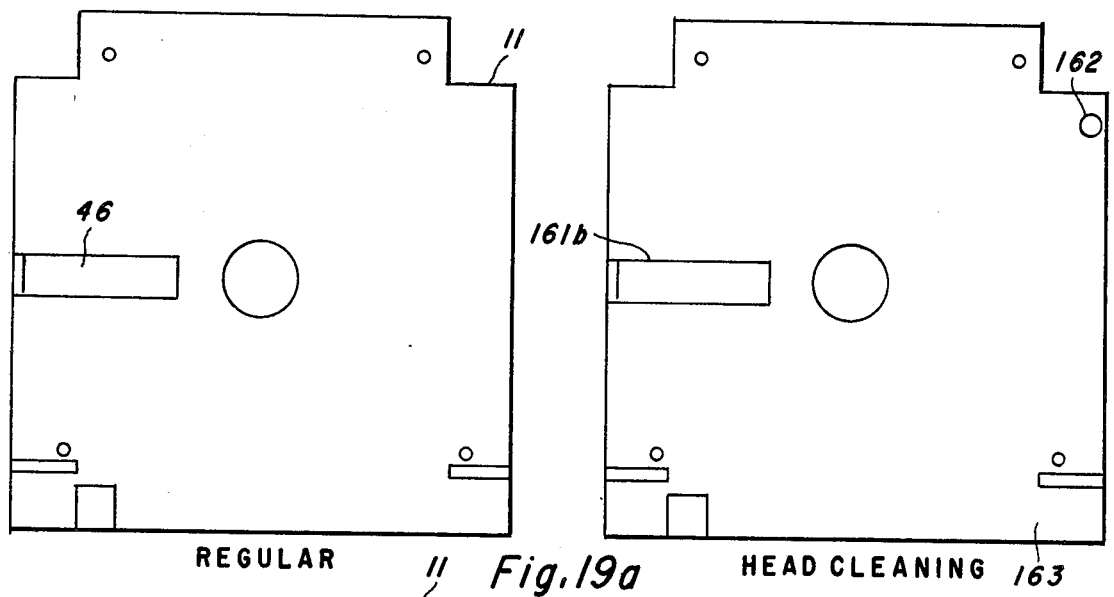
FIG. 19a shows bottom elevational views of a recording cartridge and a head cleaning cartridge used in the information storage system of the present invention.
Figure 19B:
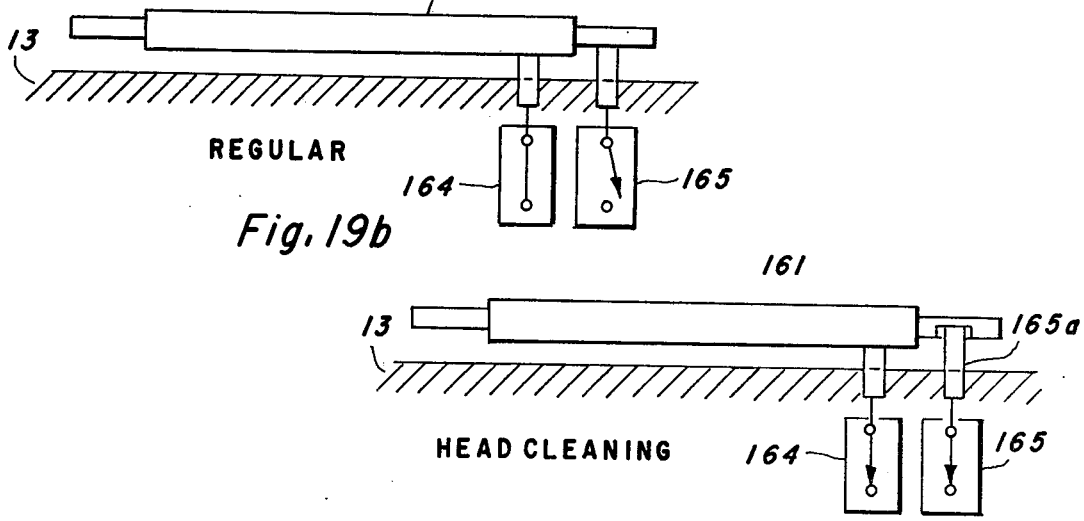

In order to remove debris and other contaminants from recording head 30 which interfere with the head-to-disc interface and prevent effective transfer to information signals, a special head cleaning cartridge 161 (FIGS. 19a and 19b) is inserted in the information storage system in lieu of the normal cartridge 11 that is used for recording and playback of information. Head cleaning cartridge 161 contains a flexible sheet of abrasive material 161a (FIG. 19c) and has substantially the same size and shape as recording cartridge 11, including rectangular opening 161b which is disposed in registration with head 30 when cleaning cartridge 161 is installed. Abrasive sheet 161a has the same size and shape as disc 37 (see FIG. 3a) and is comprised of the same flexible plastic material. Rather than having a magnetic flux-responsive coating thereon, as does disc 37, abrasive sheet 161a has a rough surface with an abrasiveness on the order of 0.3 microns to clean and polish recording surface 111. Cleaning cartridge 161 includes an additional circular opening 162 located at one corner of lower major surface 163 so that the information storage system can discriminate between recording cartridge 11 and cleaning cartridge 161. When no cartridge is inserted, switch 164 is open and switch 165 is closed. When recording cartridge 11 is inserted in holder 12 of the information system, it exerts downward biasing pressure on both switches 164 and 165 to close switch 164 and and open switch 165, thereby transmitting a binary coded signal to digital processor 27 indicative of the fact that recording cartridge 11 is installed in the system. When head cleaning cartridge 161 is inserted, it exerts biasing pressure on switch 164, only to close with switch 164. Switch 165 remains in a closed position, because opening 162 is positioned directly above mechanical member 165a of switch 165. Mechanical member 165a extends into opening 162 and remains in a released or extended position. Digital processor 27 receives a unique binary coded signal indicating that switches 164 and 165 are closed, thereby informing digital processor 27 that head cleaning cartridge 161 has been inserted.

Figure 19C:
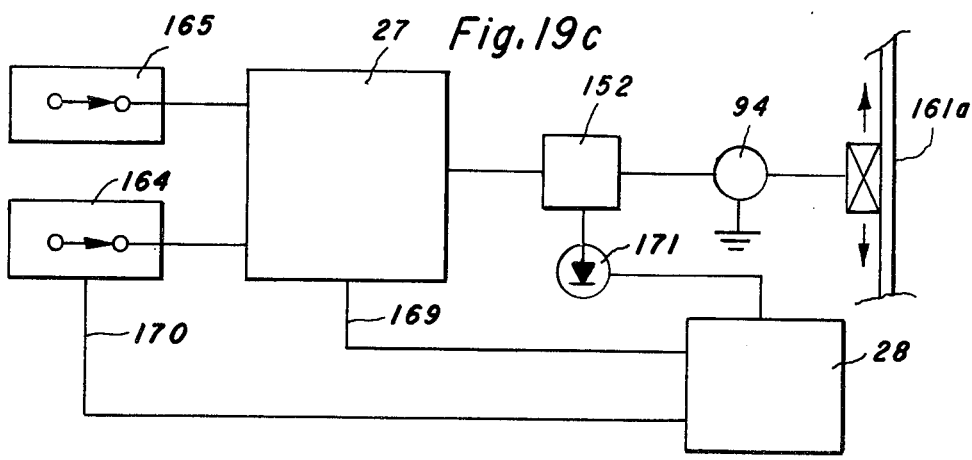
FIG. 19c is a block diagram of the system used for cleaning debris and other contaminants from the head transducer.

Referring to FIG. 19c, when digital processor 27 receives the binary coded signal indicating that head cleaning cartridge 161 is positioned in the system, it executes a head cleaning routine in accordance with the instruction set stored therein. Digital processor 27 controls analog amplifier 152 to activate linear servomotor 94 and move head 30 back and forth radially across the abrasive sheet 161a rapidly for 20 seconds, thereby polishing recording surface 111 to remove debris and other foreign matter therefrom. Abrasive sheet 161a is flexible and bends to conform more readily to the shape of head 30, thereby providing a more thorough cleaning of the entire recording surface 111. The inside of head cleaning cartridge 161 is similar to the inside of recording cartridge 11 as shown in FIG. 3 and includes four hump-shaped members 51 and raised portion 45 on the lower surface to keep abrasive sheet 161a in contact with head 30. The two parallel hump-shaped members 51 positioned above opening 46 in head cleaning cartride 161 have a more pronounced curvature than the corresponding members 51 in recording cartride 11 to cause abrasive sheet 161a to bend to conform to the shape of head 30 for more effective cleaning.

When the cleaning routine is in process, a COMPLETE signal is transmitted by digital processor 27 via line 169 to host machine 28. indicating that the system is occupied. Switch 164 transmits an electrical signal to host machine 28 via line 170 indicating that a cartridge has been inserted in the system. When abrasive sheet 161a is rotated and the cleaning routine begins, light emitting diode 171 is turned on, indicating that the system is in operation. Upon completion of the cleaning routine, head cleaning cartridge 161 is removed. Table I lists the instruction codes stored in digital processor 27 for executing the head cleaning routine.

Various embodiments of the invention have now been described in detail. Since it is obvious that many additional changes and modifications can be made in the above-described details without departing from the nature and spirit of the invention, it is understood that the invention is not to be limited to said details except as set forth in the appended claims.

media to impart rotational motion thereto and a second opening for providing access to said media for reading and/or writing information thereon;
(c) rotational means extending through said first opening for engaging said media and imparting said rotational motion thereo;
(d) a magnetic head transducer positioned in registration with said second opening for reading and/or writing information on a recording surface of said media; and
(e) an apparatus for cleaning said head transducer to remove debris and other contaminants therefrom,

TABLE I

| | | | | | | | |
|---|---|---|---|---|---|---|---|
| 000 | 003 | 00011111 | 80 | | BL | INIT | |
| 001 | 004 | 10000000 | 81 | | | | |
| | | | 82 | | | | |
| | | | 83 | | | | |
| | | | 84 | | | CLEAN | |
| | | | 85 | | | | |
| | | | 86 | THE CLEAN ROUTINE TURNS ON THE DISC MOTOR AND WAITS FOR IT TO | | | |
| | | | 87 | COME UP TO SPEED. THE FRONT PANEL LITE IS TURNED ON UNTIL THE | | | |
| | | | 88 | ROUTINE IS COMPLETE OR THE CARTRIDGE REMOVED. ONCE THE DISC | | | |
| | | | 89 | MOTOR IS UP TO SPEED THE HEAD IS MOVED FROM HOME TO TRACK 79 | | | |
| | | | 90 | USING THE ERROR ROUTINE. THIS IS DONE 14 TIMES. THE HEAD IS THEN | | | |
| | | | 91 | MOVED HOME AND LEFT THERE. THE FRONT PANEL LITE IS TURNED OFF | | | |
| | | | 92 | SIGNALING COMPLETION OF THE ROUTINE. | | | |
| | | | 93 | | | | |
| | | | 94 | | | | |
| 003 | 00C | 01000000 | 96 | CLEAN | TCY | CMPLT | TURN ON LITE. |
| 007 | 01C | 00001100 | 97 | | RSTR | | |
| 00F | 03C | 01000011 | 98 | | TCY | LOCKFLG | TEST TO SEE IF DISC MOTOR IS LOCKED |
| 01F | 03E | 00111010 | 99 | | TBIT1 | 1 | |
| 03F | 03E | 10111011 | 100 | | BR | TCLN | MOTOR LOCKED, GO AHEAD WITH CLEAN ROUTINE |
| 03E | 039 | 00010001 | 101 | | BL | SCAN | MOTOR NOT LOCKED, GO BACK TO SCAN ROUTINE |
| 03D | 036 | 10001111 | 102 | | | | |
| 03B | 02E | 01001010 | 103 | TCLN | TCY | 5 | GET COUNTER |
| 037 | 01E | 00100001 | 104 | | TMA | | |
| 02F | 03D | 01111011 | 105 | | ALEC | 13 | IS COUNTER < 14 ? |
| 01E | 038 | 10100011 | 106 | | BR | GOCLN | YES, GO MOVE HEAD. |
| 03C | 031 | 01110111 | 107 | | ALEC | 14 | IS COUNTER = 15 ? |
| 039 | 026 | 10000101 | 108 | | BR | GOHM | NO, MOVE HEAD HOME. |
| 033 | 00E | 01000000 | 109 | | TCY | CMPLT | YES, END OF CLEAN CYCLE, |
| 027 | 01D | 00001101 | 110 | | SETR | | TURN OFF LITE. |
| 00E | 03B | 01001100 | 111 | | TCY | TRUE2 | SET MUX INPUT FOR CLEAN SIGNAL |
| 01D | 037 | 00100011 | 112 | | TYA | | |
| 03A | 029 | 00001010 | 113 | | TDO | | |
| 035 | 016 | 01001101 | 114 | | TCY | 11 | |
| 02B | 02D | 00011111 | 115 | TSTCLN | LDP | 15 | LOOP UNTIL CLEANING CARTRIDGE IS REMOVED |
| 016 | 018 | 00001000 | 116 | | TKA | | |
| 02C | 032 | 00000011 | 117 | | TAM | | |
| 018 | 020 | 00111000 | 118 | | TBIT1 | 0 | IS CLEAN HIGH ? |
| 030 | 001 | 10000000 | 119 | | BR | INIT | YES, CLEANING CARTRIDGE OUT, REINITIALIZE. |
| 021 | 005 | 00010000 | 120 | | BL | TSTCLN | NO, WAIT FOR CLEAN TO GO HIGH. |
| 002 | 00B | 10101011 | 121 | | | | |
| 005 | 014 | 00001110 | 122 | GOHM | IA | | INCREMENT COUNTER. |
| 00B | 02C | 00000011 | 123 | | TAM | | |
| 017 | 01F | 01000000 | 124 | | TGY | 0 | LOAD ADDRESS EQUAL TO ZERO. |
| 02E | 03A | 01100000 | 125 | | TCMIY | 0 | |
| 01C | 030 | 01100000 | 126 | | TCMIY | 0 | |
| 038 | 021 | 00011010 | 127 | CLNERR | BL | ERROR | MOVE HEAD HOME. |
| 031 | 006 | 10000011 | 128 | | | | |
| 023 | 00D | 00001110 | 129 | GOCLN | IA | | |
| 006 | 01B | 00000011 | 130 | | TAM | | INCREMENT COUNTER. |
| 00D | 034 | 01000000 | 131 | | TCY | 0 | |
| 01B | 02F | 01100111 | 132 | | TCMIY | 14 | SET ADDRESS FOR TRACK 79. |
| 036 | 019 | 01101010 | 133 | | TCMIY | 5 | |
| 02D | 035 | 10111000 | 134 | | BR | CLNERR | MOVE HEAD HOME THEN TO TRACK 79. |

What is claimed is:

1. A system for reading and/or writing information on a sheet of flexible information storage media, said system comprising:
(a) a sheet of flexible information storage media having opposite major surfaces, at least one of said major surfaces for recording information thereon;
(b) a recording cartridge in the form of a rigid envelope containing said media therein, said cartridge having a first opening for providing access to said said apparatus comprising:
(i) a portable head cleaning cartridge in the form of a rigid envelope defining an internal chamber which contains a sheet of flexible abrasive material therein, said head cleaning cartridge for replacing said recording cartridge and said media when said head transducer is to be cleaned, said head cleaning cartridge having a first opening for permitting access to said sheet of abrasive material by said rotational means for imparting rotational motion thereto and a second opening for said head transducer to contact said abrasive material when said head cleaning cartridge is inserted into the system, said cartridge having a recess formed on an external surface thereof;

(ii) sensor means having a sensor member for mating with said recess when a head cleaning cartridge is inserted into the system to indicate that a head cleaning cartridge and not a recording cartridge has been inserted; and (iii) means for moving said head transducer back and forth across the surface of said abrasive material for a predetermined period while the sheet of abrasive material is being rotated, thereby removing debris and other contaminants from the head tranducer.

2. The system according to claim 1 wherein said sensor means includes switch means having first and second members, said first member being depressed by pressure exerted thereon by said head cleaning cartridge when said cartridge is inserted into said recording system to close a said first electrical circuit and generate a first coded signal indicative thereof, said second member extending into said recess on said external surface of said cartridge and remaining in a released position when said cartridge is inserted, thereby maintaining a second electrical circuit in a closed position and generating a second coded electrical signal indicative thereof, said first and second coded electrical signals and generated by said closed first and second electrical circuits indicating that a head cleaning cartridge has been inserted in the system.

3. The system according to claim 2 wherein said head cleaning apparatus includes means responsive to said first and second coded electrical signals for preventing new information signals generated by said recording system from being transmitted to said head transducer when said head cleaning cartridge is inserted in the system.

4. The system according to claim 3 wherein said means responsive to said first and second electrical signals is a digital processor means, said digital processor means being further responsive to said first and second coded electrical signals for controlling said head transducer to move back and forth across the surface of said sheet of abrasive material for said predetermined period of time in accordance with a head-cleaning routine stored therein.

5. The system according to claim 4 wherein said predetermined period of time is twenty seconds.

6. The system according to claim 1 wherein said abrasive material has a surface roughness on the order of 0.3 micron.

7. A head cleaning cartridge for being inserted into an information storage system for cleaning debris and other contaminants from a magnetic head transducer, said storage system including a sensor member for indicating when said head cleaning cartridge has been inserted into the system, said cartridge comprising:

(a) a sheet of abrasive material for cleaning said head transducer to remove said debris and other contaminants therefrom;

(b) a cartridge housing in the form of a rigid envelope containing said abrasive sheet therein, said housing having an opening therein for providing access for said head transducer to contact said abrasive sheet; and (c) said housing having a recess formed on an external portion thereof for mating with said sensor member in said information storage system when said cartridge is inserted therein, said sensor member for indicating that said cartridge is a head cleaning cartridge.

8. The cartridge according to claim 7 wherein said first opening and said recess are formed in said second major surface of said cartridge housing.

9. The cartridge according to claim 7 wherein said cartridge housing is comprised of first and second housing members having opposed marginal rims in mating engagement, thereby forming a protective housing for said sheet of abrasive material.

10. The cartridge according to claim 7 wherein said cartridge housing is rectangular and said recess is a circular recess located adjacent to one corner of said cartridge housing.

11. The cartridge according to claim 7 wherein said sheet of abrasive material bends to conform to the shape of the head transducer as said abrasive material is rotated above said head transducer, thereby thoroughly cleaning an upper recording surface of said head transducer.

12. The cartridge according to claim 7 wherein said sheet of abrasive material is in the shape of a circular disc and said head transducer is moved radially back and forth along said abrasive disc.

13. The cartridge according to claim 7 wherein said abrasive material has a surface roughness on the order of 0.3 micron.

14. A method of cleaning debris and other contaminants from a recording surface of a magnetic head transducer in an information storage system, comprising the steps of:

(a) providing a head cleaning cartridge in the form of a rigid envelope defining an internal chamber which contains a sheet of abrasive material therein, said cartridge having an opening for permitting access to said abrasive material for said head transducer to contact said abrasive material when said cartridge is inserted in the information storage system, said cartridge having a recess formed on an external surface thereof;

(b) providing sensor means having a sensor member for mating with said recess when said head cleaning cartridge is inserted into the system to indicate that said head cleaning cartridge has been inserted;

(c) inserting said cartridge into said information storage system so that the recording surface of said head transducer is in facing relationship with said sheet of abrasive material and the recess is in mating engagement with said sensor member, said sensor means for generating an electrical signal indicating that said head cleaning cartridge has been inserted into said system; and (d) rotating said sheet of abrasive material and moving said head transducer periodically back and forth across said sheet for a predetermined period of time in response to said electrical signal, so that said abrasive material removes debris and other contaminants from said head transducer.

15. The method according to claim 14 wherein said head transducer is moved back and forth across said abrasive material for twenty seconds.

16. The method according to claim 14 wherein said step of inserting said cartridge into said system is comprised of inserting the cartridge in a predetermined position so that said cartridge exerts biasing pressure to depress a first switch member and close a first electrical circuit and so that a second switch member is in mating engagement with a recess in said cartridge, said second switch member remaining in a released position, thereby maintaining a second electrical circuit in a closed position, said closed first and second electrical circuits generating respective first and second coded electrical signals indicating that a head cleaning cartridge has been inserted into the system.

17. The method according to claim 16 further including the step of disabling the information storage system from transmitting new information signals to said head transducer while said head cleaning cartridge is installed.

18. The method according to claim 14 wherein said head transducer is moved radially back and forth along a circular sheet of abrasive material.

19. A system for removing debris and other contaminants from a magnetic head transducer, said system comprising:
(a) a cartridge containing a sheet of abrasive material for being positioned in facing relationship with said head transducer, said cartridge having a recess formed on an external surface thereof;
(b) sensor means having a sensor member for mating with said recess when said abrasive sheet is positioned in facing relationship with said head transducer, said sensor means for transmitting an electrical signal when said sensor member is in mating engagement with said recess; and
(c) means for rotating said abrasive sheet and for moving said head transducer back and forth across said abrasive sheet for a predetermined period of time in response to said electrical signal, thereby removing debris and other contaminants from said head transducer.

20. The system according to claim 19, wherein said sensor means includes switch means having first and second members, said first member being depressed by pressure exerted thereon by said head cleaning cartridge when said cartridge is positioned in said system to close a first electrical circuit and generate a first signal indicative thereof, said second member extending into said recess and remaining in a released position when said cartridge is in position, thereby maintaining a second electrical circuit in a closed position and generating a second electrical signal indicative thereof, said first and second electrical signals indicating that said cartridge is a head cleaning cartridge.

* * * * *